(12) United States Patent
Suzuki

(10) Patent No.: US 7,535,494 B2
(45) Date of Patent: May 19, 2009

(54) MOS TYPE IMAGE PICKUP DEVICE CAPABLE OF TAKING FULL PICTURE AT ONE TIME

(75) Inventor: Nobuo Suzuki, Miyagi (JP)

(73) Assignee: Fujifilm Corp., Tokyo (JP)

( * ) Notice: Subject to any disclaimer, the term of this patent is extended or adjusted under 35 U.S.C. 154(b) by 657 days.

(21) Appl. No.: 09/824,007

(22) Filed: Apr. 3, 2001

(65) Prior Publication Data

US 2003/0206235 A1  Nov. 6, 2003

(30) Foreign Application Priority Data

Apr. 3, 2000 (JP) ............... 2000-100411

(51) Int. Cl.
  *H04N 3/14* (2006.01)
  *H04N 5/335* (2006.01)
  *H04N 5/225* (2006.01)
(52) U.S. Cl. .................. 348/220.1; 348/308
(58) Field of Classification Search ........... 348/308, 348/220.1
  See application file for complete search history.

(56) References Cited

U.S. PATENT DOCUMENTS

| | | | |
|---|---|---|---|
| 4,189,749 A | 2/1980 | Hiroshima et al. ......... 348/214 |
| 4,212,034 A | 7/1980 | Kokie et al. .............. 348/305 |
| 4,827,348 A * | 5/1989 | Ernest et al. ............ 348/221.1 |
| 5,382,974 A * | 1/1995 | Soeda et al. ............ 348/221.1 |
| 5,452,004 A * | 9/1995 | Roberts .................. 348/301 |
| 5,982,318 A * | 11/1999 | Yiannoulos .............. 348/294 |
| 6,239,839 B1 * | 5/2001 | Matsunaga et al. ....... 348/308 |
| 6,369,853 B1 * | 4/2002 | Merrill et al. ............ 348/302 |
| 6,480,227 B1 * | 11/2002 | Yoneyama ............... 348/308 |
| 7,151,567 B2 * | 12/2006 | Suzuki et al. ........... 348/220.1 |
| 7,202,890 B2 * | 4/2007 | Miyamoto ............... 348/220.1 |
| 2001/0033333 A1 * | 10/2001 | Suzuki et al. .............. 348/220 |
| 2005/0200719 A1 * | 9/2005 | Kubo ..................... 348/220.1 |
| 2006/0146160 A1 * | 7/2006 | Murakami et al. ......... 348/308 |

* cited by examiner

*Primary Examiner*—John M Villecco
(74) *Attorney, Agent, or Firm*—Arent Fox LLP

(57) ABSTRACT

In a shooting operation of a digital camera including a MOS-type solid-state image pickup device to produce a still picture, a predetermined electronic shutter operation is interrupted to conduct a reset operation for all photoelectric converter elements at a time, a strobe device is operated after the reset operation, a light shielding device is then operated for a predetermined period of time, and an image signal readout operation is conducted during the operation of the light shielding device to obtain still picture data. Even if a shooting object is moving at a high speed, a still picture undergone backlight correction can be obtained without any blur.

17 Claims, 15 Drawing Sheets

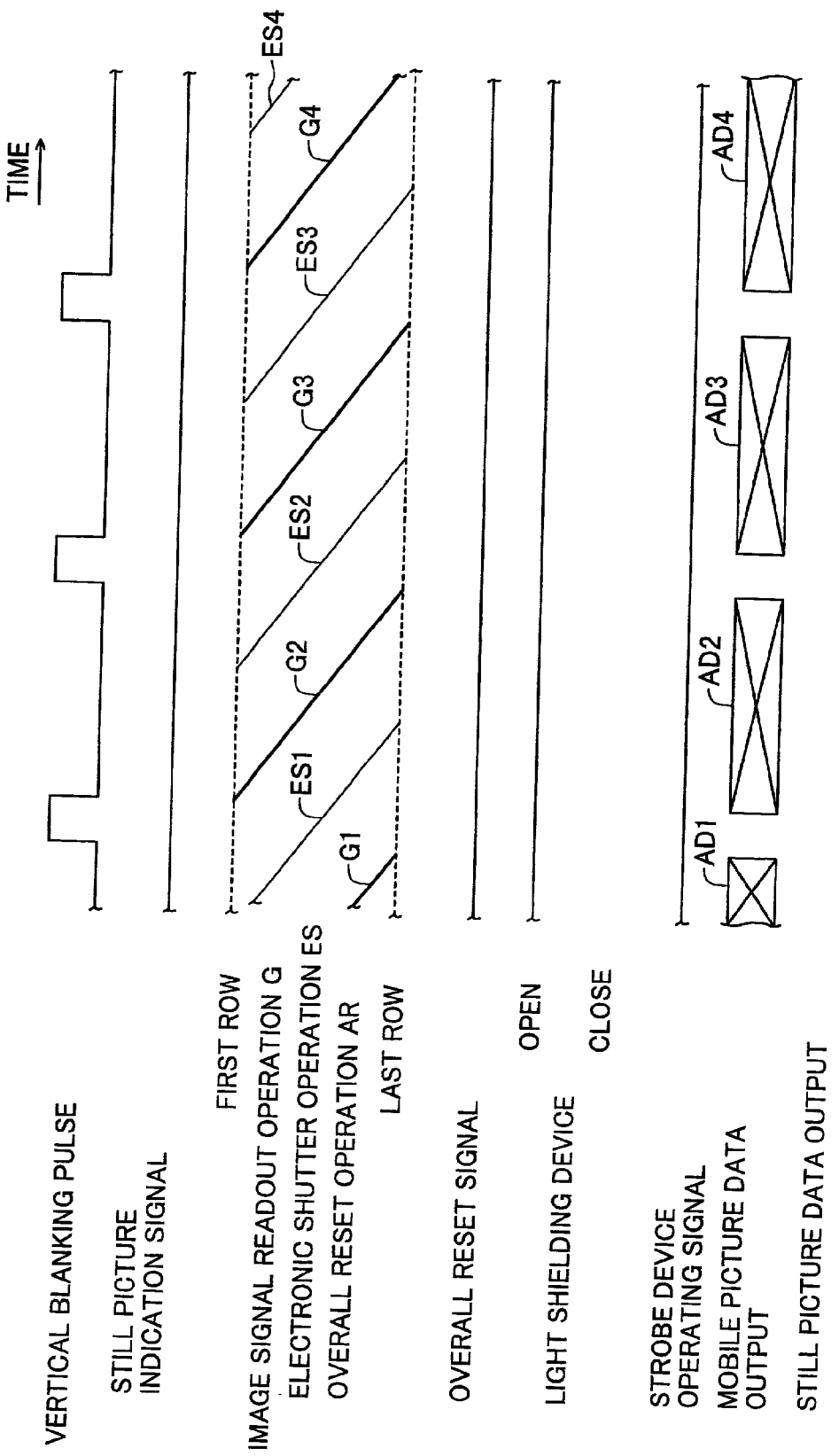

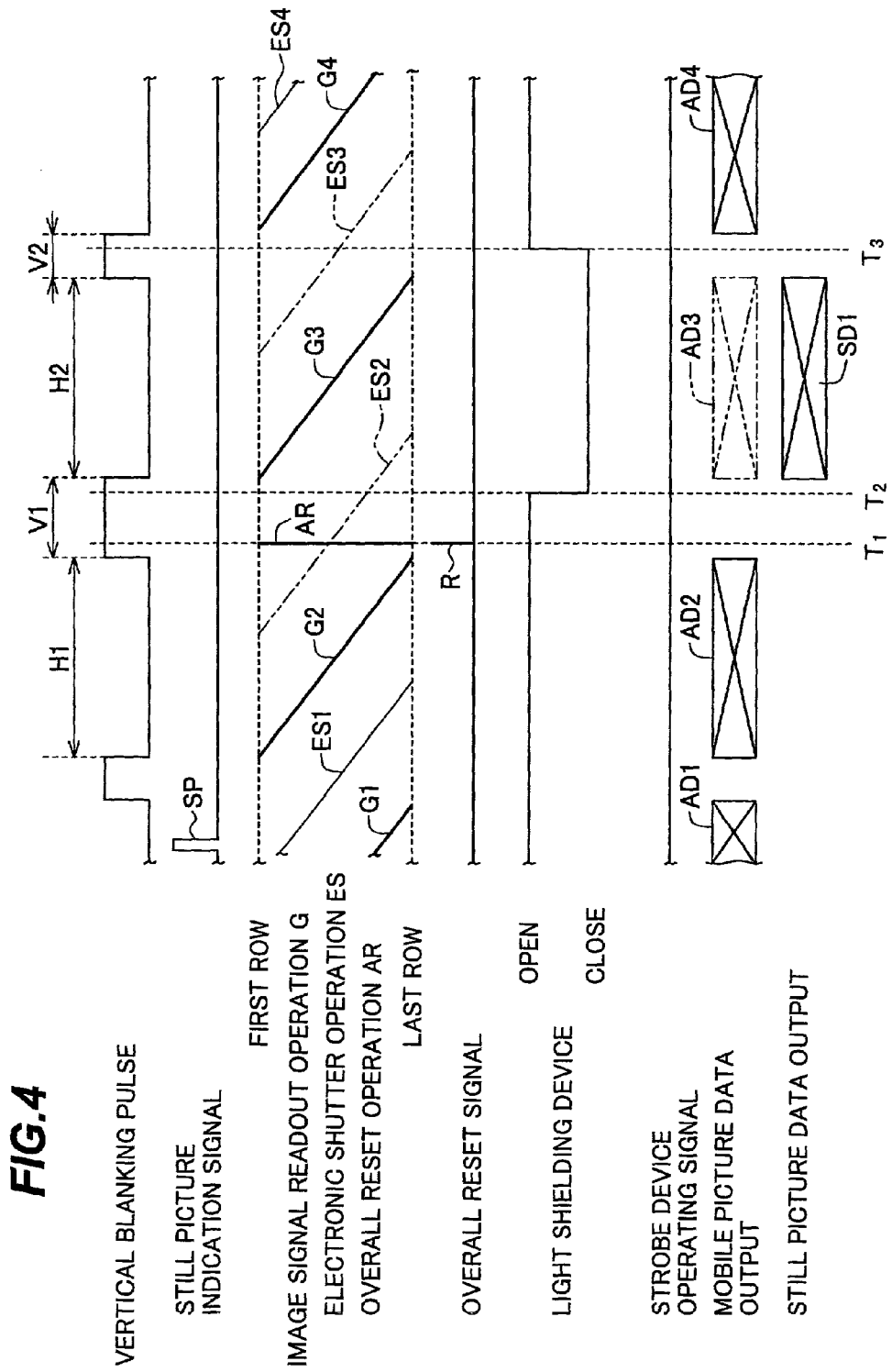

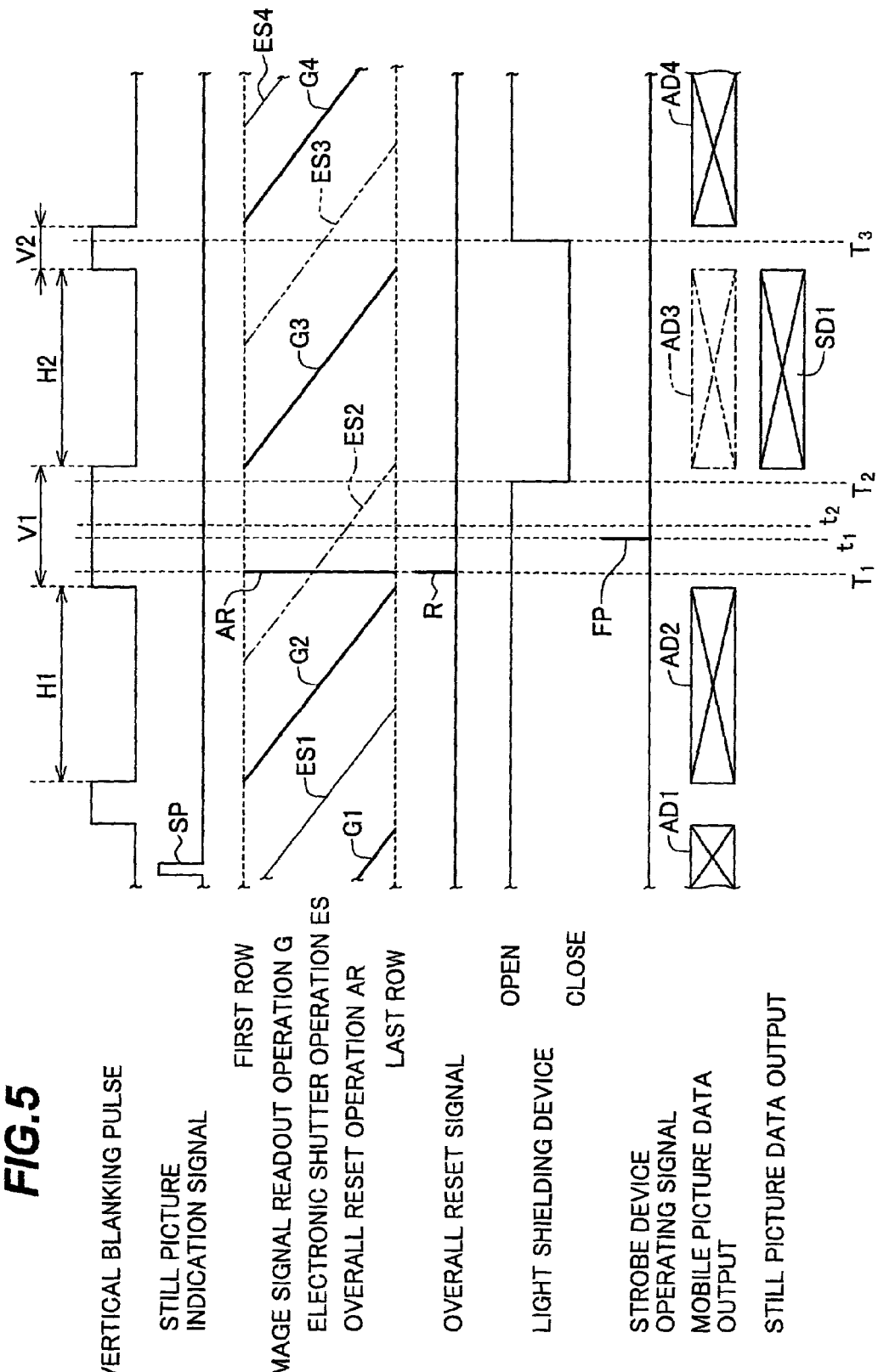

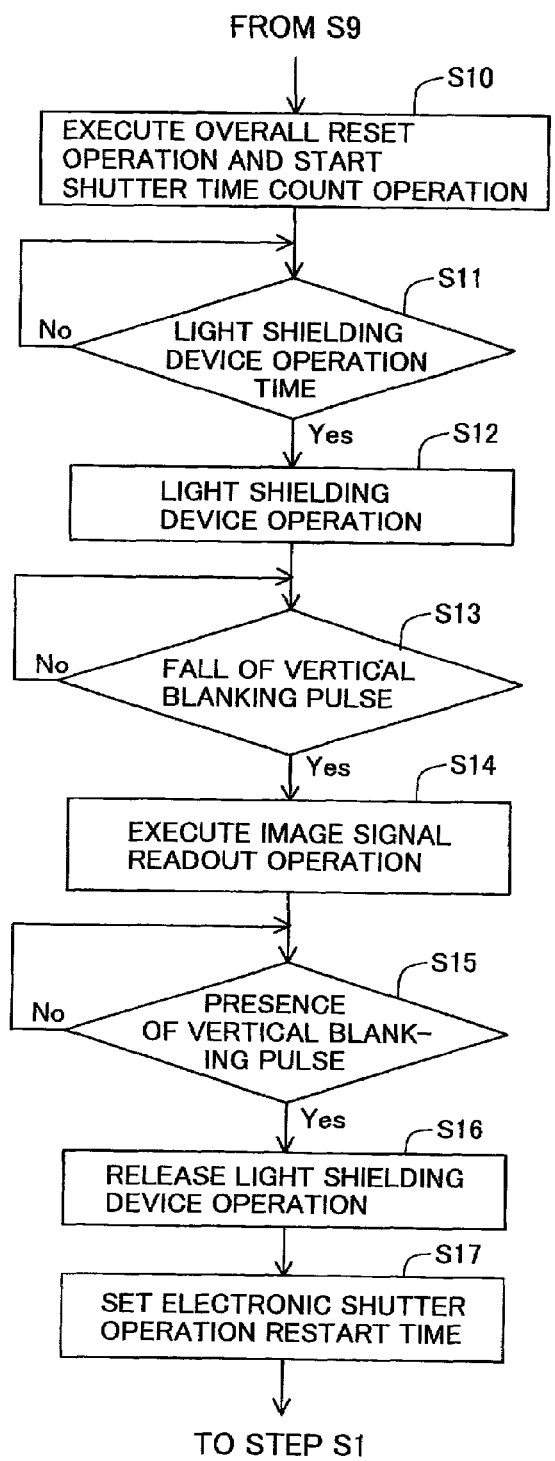

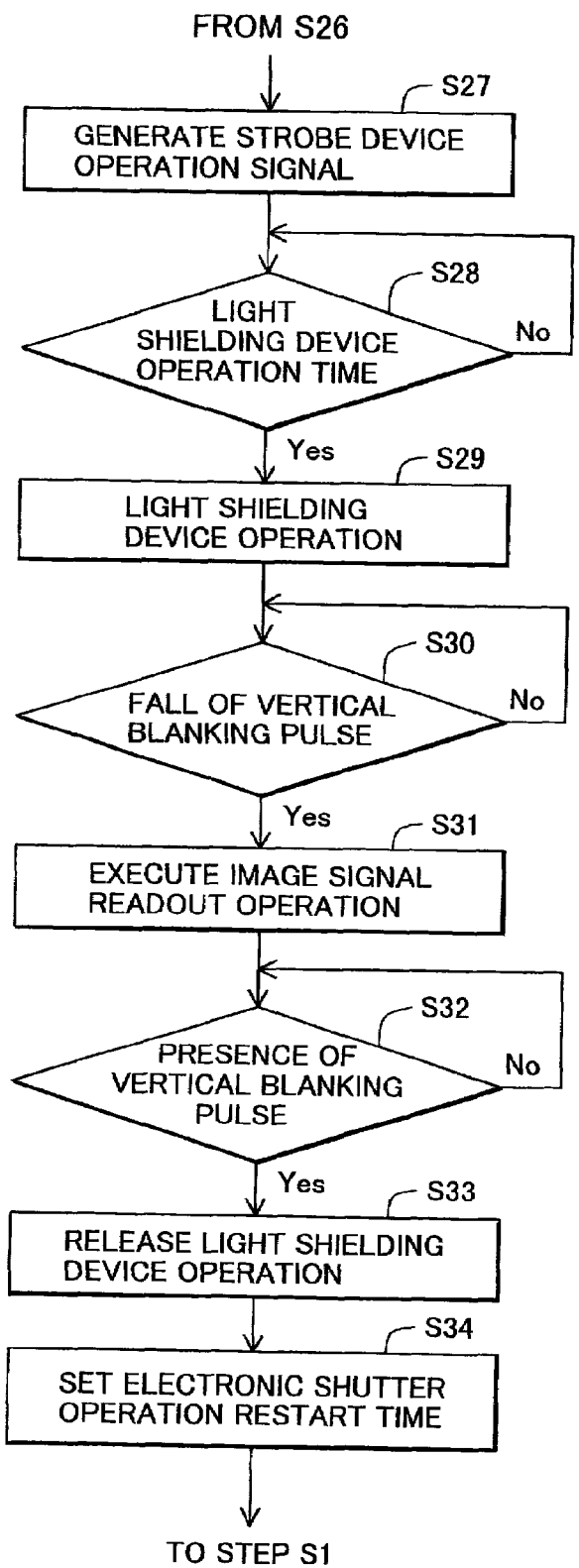

MOS TYPE IMAGE PICKUP DEVICE CAPABLE OF TAKING FULL PICTURE AT ONE TIME

This application is based on Japanese Patent Application 2000-100411 filed on Apr. 3, 2000, the entire contents of which are incorporated herein by reference.

BACKGROUND OF THE INVENTION a) Field of the Invention

The present invention relates to a solid-state image pickup device of metal oxide semiconductor (MOS) type and a digital camera using the same for producing mobile picture data and still picture data.

b) Description of the Related Art

Since the mass-producing technique of a charge-coupled device (CCD) has been developed, devices and apparatuses using a CCD-type solid-state image pickup device as a line sensor or an area image sensor have been rapidly spread in the world.

On the other hand, with spread of personal digital assistants and the like, a MOS-type solid-state image pickup device consuming less power than the CCD-type solid-state image pickup device is being developed. In the MOS-type solid-state image pickup device, the power consumption can be lowered to, for example, about from $1/5$ to about $1/10$ of that of the CCD-type solid-state image pickup device.

A MOS-type solid-state image pickup device includes a semiconductor substrate, a large number of pixels formed in one surface of the semiconductor in the form of a matrix with a plurality of rows and a plurality of columns, an output signal line disposed for each pixel column in the vicinity thereof, and an image signal outputting device electrically connected to the output signal lines. Each pixel includes a photoelectric converter element and at least one transistor electrically connected to the photoelectric converter element. The output signal lines have desirably low resistance and are usually formed by using metallic material.

In this specification, in the array of the pixels arranged in rows and columns, pixels arranged in a direction in which the output signal lines extend form "pixel columns", and the direction is called "pixel column direction". A direction intersecting the pixel column direction is called "pixel row direction", pixels arranged in this direction form "pixel rows". When the output signal line meanders, a direction in which the output signal line generally extends is assumed as the extending direction of the output signal line.

Several configurations of MOS-type solid-state image pickup devices are known. In one of the known configurations of the MOS-type solid-state image pickup device, each pixel includes an output transistor and a reset transistor. In this specification, the MOS-type solid-state image pickup device of this type is referred to as "MOS-type solid-state image pickup device I" depending on cases.

In the pixel of the MOS-type solid-state image pickup device I, a control terminal (gate electrode) of the output transistor is electrically connected to the photoelectric converter element, and each output signal line has a load resistor. When a voltage representing electric charge accumulated in the photoelectric converter element is applied to the control terminal of the output transistor, an output signal (analog voltage signal) appears or is generated on an associated output signal line. The image signal outputting device outputs the analog voltage signal directly to an external device or converts the analog voltage signal into a digital signal and then outputs the digital signal to an external device.

The electric charge in the photoelectric converter element is kept remained. Before a next output signal is to be generated on the output signal line, it is necessary after the signal output operation of the photoelectric converter element to discharge the charge remaining in the photoelectric converter element to predetermined wiring line or the like. The reset transistor is used to control the discharge of electric charge from the photoelectric converter element. One reset transistor is arranged for each photoelectric converter element.

In a digital camera having a mobile picture mode to produce mobile picture data and a still picture mode to produce still picture data, the mobile picture mode is ordinarily booted and used in its shooting operation. Only when necessary, the still picture mode is used for the shooting. In the shooting operation, an image signal readout period and a vertical blanking period are alternately set in the digital camera.

In a digital camera including a MOS-type solid-state image pickup device, in each image signal readout period, the MOS-type solid-state image pickup device produces output signals necessary to obtain one frame of image data.

When the MOS-type solid-state image pickup device is a MOS-type, solid-state image pickup device I, the output signals necessary to obtain one frame of image data are sequentially generated on the output signal lines, for example, in the pixel row unit. Operation of each output transistor is controlled in the pixel row unit. One row selection signal line is disposed for each pixel row. A row selection signal to control generation of an output signal is supplied via the row selection signal line to each associated pixel.

In this specification, an operation in which the output signals necessary to obtain one frame of image data are sequentially generated on the output signal lines for each pixel row is called "image signal readout operation". During one image signal readout period, one image signal readout operation is conducted. Ordinarily, the image signal readout operation starts at a start point of the image signal readout period and ends an end point thereof. One image signal readout period ranges, for example, from about $1/60$ second to $1/30$ second.

When the MOS-type solid-state image pickup device is a MOS-type solid-state image pickup device I, by sequentially operating the reset transistors in the pixel row unit, a row reset operation can be conducted to sequentially discharge the electric charge accumulated in each photoelectric converter element from the respective elements in the pixel row unit.

To determine a period of exposure time for each photoelectric converter element, the row reset operation is conducted at a predetermined point of time. The row rest operation corresponds to operation of an electronic shutter. If light continuously enters the photoelectric converter elements, charge accumulation sequentially starts again beginning at the pixel row having finished the electronic shutter operation. For each pixel, a period of time from when the electronic shutter operation is finished to when a subsequent image signal readout operation is started is the period of exposure time.

A length of a period of time required to conduct the electronic shutter operation for all pixel rows is substantially equal to a length of one image signal readout period. One electronic shutter operation starts at a predetermined point of time during one image signal readout period and ends at a predetermined point of time during a subsequent image signal readout period.

To control each reset transistor, one reset signal supply line is disposed for each pixel row. A reset signal is supplied via the reset signal line to the associated reset transistor.

When necessary, at a particular point of time during a period of time between an image signal readout operation and a subsequent electronic shutter operation, for example, each time an output signal is generated on each output signal line in the pixel row unit, electric charge is discharged to a predetermined line from the pertinent photoelectric converter elements from which output signals are just outputted. The operation to generate an output signal on each output signal line for each pixel row and the operation to discharge electric charge from the photoelectric converter elements in the pixel row unit are sequentially conducted in this order in the pixel row unit. At a predetermined point of time thereafter, an electronic shutter operation is again conducted.

To supply a row selection signal to each of the row selection signal lines at predetermined timing, a readout row-shifter is usually formed on the pertinent semiconductor substrate. To supply a reset signal to each of the reset signal lines at predetermined timing, a reset row-shifter is usually formed on the pertinent semiconductor substrate.

To produce a digital output signal, an image signal outputting device can be composed of an analog-to-digital (A/D) converter. The A/D converter receives an analog voltage signal and outputs a digital signal representing the analog voltage signal to a buffer memory. In a MOS-type solid-state image pickup device including such an A/D converter, the digital signal from the A/D converter is an image signal.

Operations of each shifter and the image signal outputting device are controlled by a controller. The controller is usually formed on the pertinent semiconductor substrate.

To produce a bright image of an object by shooting the object against backlight, strobe light or flashlight is desirably used to provide sufficient exposure for the object. In other words, backlight correction is desired.

However, there has not been materialized a digital camera which is a digital camera using a MOS-type solid-state image pickup device conducting a row-sequential image signal readout operation and which has a backlight correcting function.

When an object moving at a high speed is shot by using the digital camera, the shutter time varies between an upper section and a lower section of an image of the object, and hence a blur appears in the image. Because, at electronic shutter operation, electric charge accumulated in the photoelectric converter elements is sequentially discharged in the pixel row unit, a point of shutter time varies between the pixel rows.

SUMMARY OF THE INVENTION

It is therefore an object of the present invention to provide a MOS-type solid-state image pickup device being capable of easily constitute a digital camera having a backlight correcting function.

Another object of the present invention is to provide a MOS-type solid-state image pickup device capably of easily constitute a digital camera in which even when an object moving at a high speed is shot to produce a still picture, a blur rarely takes place in the still picture.

Still another object of the present invention is to provide a MOS-type solid-state image pickup device capably of easily constitute a digital camera in which even when an object moving at a high speed is shot to produce a still picture, a blur rarely takes place in the still picture and to which a backlight correcting function can be easily added.

According to one aspect of the present invention, there is provided a MOS-type solid-state image pickup device comprising a semiconductor substrate; a large number of pixels arranged in one surface of said semiconductor substrate in an array having a plurality of rows and a plurality of columns, each said pixel includes (a) a photoelectric converter element and (b) a switching circuit electrically connected to said photoelectric converter element for controlling generation of an output signal representing electric charge accumulated in said photoelectric converter element and discharge of the electric charge; a row selection signal line disposed for each pixel row and being electrically connected to associated switching circuits, each said row selection signal line receiving a row selection signal for controlling the generation of the output signal; a plurality of output signal lines each of which being associated with at least one pixel column and receiving the output signal from associated switching circuits; a reset signal line disposed for each said pixel row and being electrically connected to associated switching circuits, each said reset signal line receiving a reset signal for controlling the discharge of the electric charge; and an overall reset controller for supplying the reset signal to said reset signal lines at a time.

According to another aspect of the present invention, there is provided a digital camera comprising a MOS-type solid-state image pickup device, comprising: (i) a semiconductor substrate; (ii) a large number of pixels arranged in one surface of said semiconductor substrate in an array having a plurality of rows and a plurality of columns, each said pixel includes (a) a photoelectric converter element and (b) a switching circuit electrically connected to said photoelectric converter element for controlling generation of an output signal representing electric charge accumulated in said photoelectric converter element and discharge of the electric charge; (iii) a row selection signal line disposed for each pixel row and being electrically connected to associated switching circuits, each said row selection signal line receiving a row selection signal for controlling the generation of the output signal; (iv) a plurality of output signal lines each of which being associated with at least one pixel column and receiving the output signal from associated switching circuits; (v) a reset signal line disposed for each said pixel row and being electrically connected to associated switching circuits, each said reset signal line receiving a reset signal for controlling the discharge of the electric charge; (vi) a readout row-shifter for sequentially supplying the row selection signal to said row selection signal lines; (vii) a reset row-shifter for sequentially supplying the reset signal to said reset signal lines; (viii) an overall reset controller for supplying the reset signal to said reset signal lines at a time; and (ix) an image signal outputting device electrically connected to said output signal lines for generating an image signal representing the output signal and for sequentially outputting the image signal; an image signal processor for generating mobile picture data or still picture data using the image signal outputted from said MOS-type solid-state image pickup device; a light shielding device for interrupting light incident to said MOS-type solid-state image pickup device;

a still picture indication signal generator for generating a still picture indication signal indicating shooting of a still picture; a mobile picture mode controller electrically connected to said MOS-type solid-state image pickup device for continually control operation thereof for repeatedly conducting (a) an image readout operation in which the row selection signal is sequentially supplied from said readout row-shifter to a predetermined number of row selection signal lines for sequentially outputting from said image signal outputting device an image signal representing the output signal generated on each said output signal line and (b) an electronic shutter operation in which the reset signal is sequentially supplied from said reset row-shifter to said reset signal supply lines at least associated with said pixel row as an object of the image signal readout operation for sequentially discharge electric charge accumulated in said photoelectric converter elements; and a first still picture mode controller electrically connected to said MOS-type solid-state image pickup device for controlling in place of said mobile mode controller, when the still picture indication signal is outputted, operations of said MOS-type solid-state image pickup device and said light shielding device, for conducting an overall reset operation in which the overall reset controller is operated, in a state in which the operations of said readout row-shifter and said rest row-shifter are stopped, and electric charge accumulated in all said photoelectric converter elements is discharged, and for conducting an image signal readout operation in which said light shielding device is operated and interrupts the incident light for a predetermined period of time after the overall reset operation is finished, and the row selection signal is sequentially supplied from said readout row-shifter to said row selection signal lines for sequentially outputting an image signal representing the output signal generated on said output signal lines from said image signal outputting device.

If the MOS-type solid-state image pickup device can conduct the overall reset operation, by combining the image pickup device with a light shielding device such as a mechanical shutter, an identical shutter time can be set for all photoelectric converter elements. Even when a shooting object is moving at a high speed, a still picture can be produced without any blur.

By conducting, for example, the overall reset operation, the operation of the strobe device, and interruption of light by the light shielding device in this order during one vertical blanking period and continuously interrupt light by the light shielding device until a subsequent image signal readout operation is finished, it is possible to produce still picture data of an object for which a desired backlight correction has been conducted. A period of time from when the overall reset operation is conducted to when the light is interrupted by the light shielding device is the exposure time.

In the specification, a "strobe device" collectively indicates a stroboscopic lamp and a flash lamp. The stroboscopic lamp is integrally disposed in the digital camera or is detachably attached to a strobe device installing device disposed in the digital camera. The flash lamp is detachably attached to the strobe device installing device disposed in the digital camera.

BRIEF DESCRIPTION OF THE DRAWINGS

The objects and features of the present invention will become more apparent from the consideration of the following detailed description taken in conjunction with the accompanying drawings in which:

FIG. 3 is a signal timing chart for explaining a relationship between a vertical blanking pulse, a still picture indication signal, operation of the MOS-type solid-state image pickup device, an overall reset signal, operation of a light shielding device, a strobe device operation signal, and an output from an image signal processing unit when the digital camera shown in FIG. 2 operates in a mobile picture mode under control of a mobile picture mode controller;

FIG. 4 is a signal timing chart for explaining a relationship between a vertical blanking pulse, a still picture indication signal, operation of the MOS-type solid-state image pickup device, an overall reset signal, operation of a light shielding device, a strobe device operation signal, and an output from an image signal processing unit when the digital camera shown in FIG. 2 operates under control of a first still picture mode controller;

FIG. 5 is a signal timing chart for explaining a relationship between a vertical blanking pulse, a still picture indication signal, operation of the MOS-type solid-state image pickup device, an overall reset signal, operation of a light shielding device, a strobe device operation signal, and an output from an image signal processing unit when the digital camera shown in FIG. 2 operates under control of a second still picture mode controller;

FIG. 6B is a flowchart schematically showing another part of control operation in the digital camera shown in FIG. 2;

FIG. 7B is a flowchart schematically showing still another part of control operation in the digital camera shown in FIG. 2;

DESCRIPTION OF THE PREFERRED EMBODIMENTS

Figure 1A:
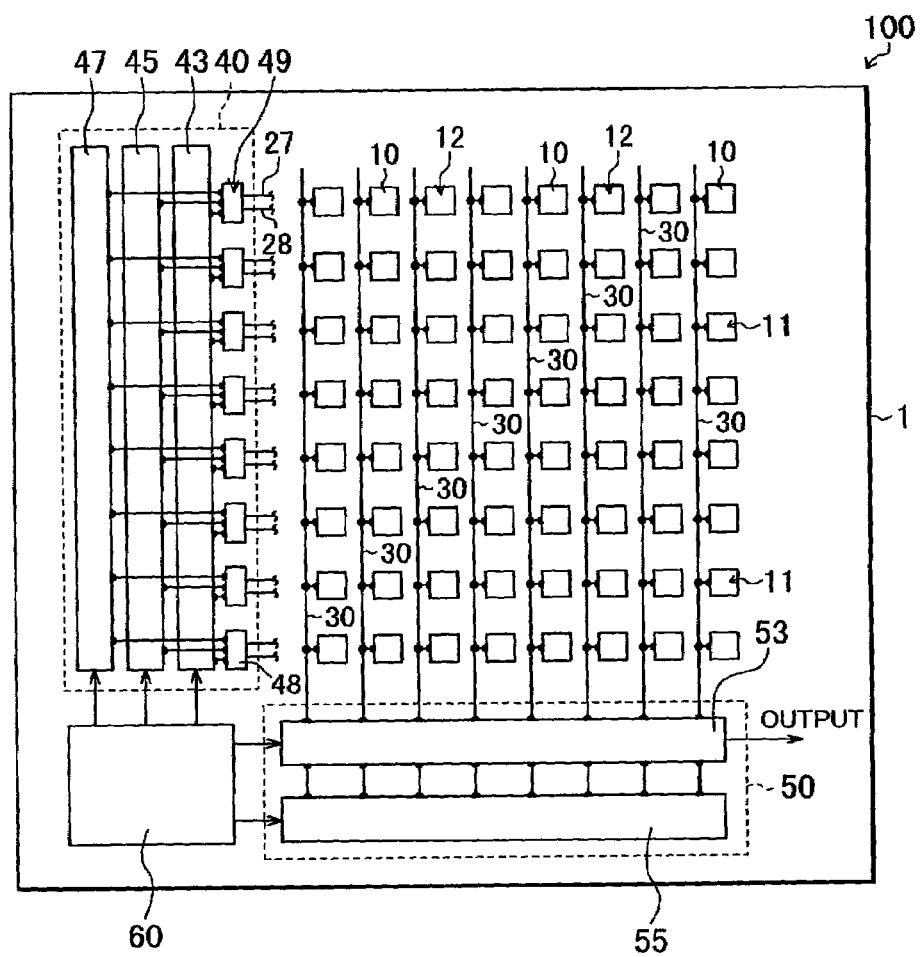
FIG. 1A is a plan view schematically showing a MOS-type solid-state image pickup device according to an embodiment.
Figure 1B:
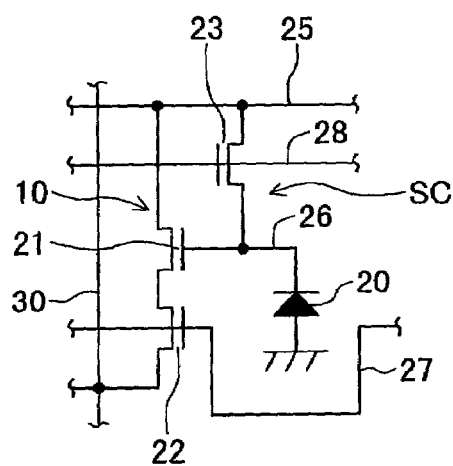
FIG. 1B is an equivalent circuit diagram showing an example of a switching circuit in a MOS-type solid-state image pickup device.

FIG. 1A schematically shows a MOS-type solid-state image pickup device according to an embodiment in a plan view. FIG. 1B shows an example of a pixel of a MOS-type solid-state image pickup device in an equivalent circuit diagram.

In a MOS-type solid-state image pickup device 100 shown in FIG. 1A, a large number of pixels 10 are arranged in the form of an array in one surface of a semiconductor substrate 1.

In the simplified configuration of FIG. 1A, 64 pixels 10 are arranged in an array having eight rows 11 and eight columns 12. An actual MOS-type solid-state image pickup device includes, for example, from several hundred thousand pixels to several million pixels.

Along an edge of the semiconductor substrate 1, a column-directional shifter 40 is provided on the substrate 1. The shifter 40 includes a readout row-shifter 43, a reset row-shifter 45, and an overall reset controller 47. For each pixel row 11, one control signal generating device 48 is disposed. The control signal generating devices 48 constitutes one control signal generating unit 49.

The control signal generating unit 49 is connected to the readout row-shifter 43 to constitute part of the readout row-shifter 43 and is connected to the reset row-shifter 45 to constitute part of the reset row-shifter 45. The unit 49 is also connected to the overall reset controller 47 to constitute part of the overall reset controller 47.

Along another edge of the semiconductor substrate 1, an image signal outputting device 50 is disposed on the substrate 1. The outputting device 50 includes an analog signal generator 53 and a row-directional shifter 55. In a corner of the semiconductor substrate 1, a controller 60 is disposed.

As shown in FIG. 1B, each pixel 10 includes a photoelectric converter element 20, a switching circuit SC arranged for the converter element 20. Each switching circuit SC includes an output transistor 21, a row selection transistor 22, and a reset transistor 23. On each photoelectric converter element 20, a color filter and/or a microlens may be disposed.

When the semiconductor substrate 1 is an n-type silicon substrate having a p-type well, each photoelectric converter element 20 can be constructed, for example, by forming an n-type impurity diffused region in a predetermined place of the p-type well. By forming, for example, a $p^+$-type impurity diffused region on a surface of the n-type impurity diffused region, a photoelectric converter element 20 of a buried type photo diode can be constituted.

Each photoelectric converter element 20 is surrounded in a plan view by a channel stop region formed in the semiconductor substrate 1 or a field oxide film formed on the semiconductor substrate 1. The channel stop region is, for example, a $p^+$-type impurity diffused region. The $p^+$-type impurity diffused region is higher in impurity concentration than the p-type well.

The photoelectric converter elements 20 are arranged in an array having eight rows and eight columns with a pitch of, for example, several micrometers (μm) to about ten μm in the pixel row and column directions.

The output transistor 21, the row selection transistor 22, and the reset transistor 23 which constitute the pixel 10 are, for example, MOS transistors.

Between a constant-voltage supply line 25 and the output signal line 30, the output transistor 21 and the row selection transistor 22 are connected in series to each other. The transistors 21 and 22 are electrically connected to the constant-voltage supply line 25 and the output signal line 30, respectively. The constant-voltage supply line 25 is supplied with, for example, a voltage of a power supply.

A control terminal (gate) of the output transistor 21 is electrically connected via a wiring line 26 to the photoelectric converter elements 20.

A control terminal (gate) of the row selection transistor 22 is electrically connected to a row selection signal line 27. Structurally, part of the line 27 may serve as the gate electrode of the transistor 22.

The reset transistor 23 is electrically connected to the gate electrode of the output transistor 21 and the constant-voltage supply line 25. A control terminal (gate) of the reset transistor 23 is electrically connected to a reset signal line 28. Structurally, part of the line 28 may serve as the gate electrode of the transistor 23.

For each pixel row 11, for example, one constant-voltage supply line 25 extends along the pixel row 11. For each pixel column 12, one constant-voltage supply line 25 may extend along the pixel column 12.

The constant-voltage supply line 25 is made of metallic material such as aluminum, an aluminum alloy, copper, a copper alloy, tungsten, a tungsten alloy, molybdenum, or a molybdenum alloy.

One row selection signal line 27 extends, for example, for each pixel row 11 along the row 11. Each row selection signal line 27 reaches, at its one end, an associated control signal generating device 48 and receives a control selection signal from the device 48.

One reset signal line 28 extends, for example, for each pixel row 11 along the row 11. Each reset signal line 28 reaches, at its one end, an associated control signal generating device 48 and receives a reset signal from the device 48.

The row selection signal lines 27 and the reset signal lines 28 are made of, for example, a polycrystalline silicon layer also used as the gate electrode of the associated transistor, a poly-cide layer (lamination layer of a polycrystalline silicon layer and a silicide layer), or a layer of electrically conductive metal connected to the gate electrode of the associated transistor, the metal being, for example, tungsten, a tungsten alloy, molybdenum, or a molybdenum alloy.

One output signal line 30 extends for each pixel column 12 along the column 12. Each output signal line 30 is electrically connected via the row selection transistor 22 and the output transistor 21 to one photoelectric converter element 20. The output signal line 30 reaches, at its end, the analog signal generator 53.

The output signal line 30 desirably has low electrical resistance. Particularly, when it is necessary to produce an output signal by flowing an electric current therethrough, the resistance of the output signal line 30 is desirably lowered. The output signal line 30 with such low electrical resistance can be formed by using, metallic material such as aluminum, an aluminum alloy, copper, a copper alloy, tungsten, a tungsten alloy, molybdenum, or a molybdenum alloy.

The constant-voltage supply lines 25, the row selection signal lines 27, the reset signal lines 28, and the output signal lines 30 are arranged on the semiconductor substrate 1, for example, with an electrically insulating layer between the substrate 1 and the lines 25, 27, 28, and 30. The lines 25, 27, and 28 are disposed in parallel with each other and extend in a direction to cross the output signal lines 30. It is also possible that an electrically conductive layer is formed in the semiconductor substrate 1 and the output signal lines 30 are formed by using the inner conductive layers and electrically conductive layers on the semiconductor substrate 1. The lines are electrically connected via the transistors to each other and are electrically isolated from each other in other locations.

The readout row-shifter 43 generates a signal for each control signal generating device 48 to generate a row selection signal in a predetermined order. The row selection signal is supplied via the row selection signal line 27 to the row selection transistor 22.

The reset row-shifter 45 generates a signal for each control signal generating device 48 to generate a reset signal in a predetermined order. The reset signal is supplied via the reset signal line 28 to the reset transistor 23.

The overall reset controller 47 generates an overall reset signal for the control signal generating devices 48 to generate a reset signal at a time.

The analog signal generator 53 sequentially generates an analog voltage signal based on a voltage change generated on each output signal line 30 in the pixel row unit, the voltage change represent quantity of electric charge accumulated in each photoelectric converter element 20.

Figure 1C:
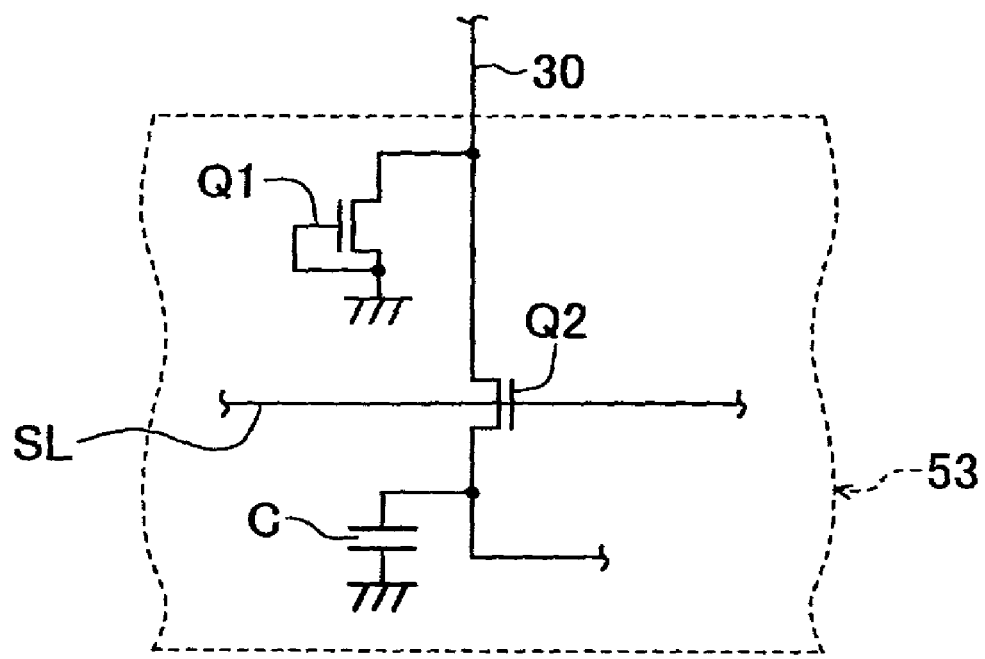
FIG. 1C is a circuit diagram showing an example of a primary section of an analog signal generator in an image signal outputting device of the a MOS-type solid-state image pickup device shown in FIG. 1A.

As shown in FIG. 1C, the analog signal generator 53 includes, for example, load transistors Q1, capacitors C, sampling transistors Q2, and a sampling signal line SL connected to control terminals (gates) of the sampling transistors Q2. One load transistor Q1, one capacitor C, and one sampling transistor Q2 are disposed for each output signal line 30. One sampling signal line SL is electrically connected to all sampling transistors Q2.

The load transistor Q1 generates, according to change in electrical resistance of the output transistor 21, an electric signal (analog voltage signal) at a connecting point thereof to the associated output signal line 30. The capacitor C samples and holds the analog voltage signal. The sampling transistor Q2 controls, according to a sampling control signal supplied via the sampling signal line SL from the controller 60, supply of the analog voltage signal from the load transistor Q1 to the capacitor C.

The row-directional shifter 55 controls operation of the analog signal generator 53 to sequentially output analog voltage signals therefrom.

The row-directional shifter 55 includes, for example, a shift register achieving a shift operation to sequentially select, according to a clock pulse, the analog voltage signals generated in the analog signal generator 53 and a circuit to generate a timing pulse necessary to convert the selected analog voltage signal into an output signal.

The controller 60 controls operations of the readout row-shifter 43, the reset row-shifter 45, the overall reset controller 47, the analog signal generator 53, and the row-directional shifter 55.

In the MOS-type solid-state image pickup device 100, by controlling operation of the readout row-shifter 43, an image signal representing electric charge accumulated in each photoelectric converter element 20 can be generated in the pixel row unit. By controlling operation of the reset row-shifter 45, the photoelectric converter elements 20 can be reset in the pixel row unit.

By controlling operation of the overall reset controller 47, the overall reset operation can be conducted to reset the photoelectric converter elements 20 at a time. In the overall reset operation, electric charge accumulated in each photoelectric converter element 20 is discharged to the associated constant-voltage supply line 25 at a time.

Using a digital camera constituted by combining the MOS-type solid-state image pickup device 100 with a light shielding device to appropriately control incidence of light to the device 100 and shielding of the light, such as a shutter, for example, a mechanical shutter, the shutter time can be set to an identical point of time for all pixels 10. Even when a shooting object is moving at a high speed, a still picture can be produced without any blur.

Using a strobe device and conducting, for example, the overall reset operation, operation of the strobe device, and the shielding of light by the light shielding device in this order during one vertical blanking period, there can be produced still picture data undergone backlight correction. In this situation, a period of time when the overall reset operation is executed to when the light is shielded by the light shielding device is a period of exposure time. The shielding of light by the light shielding device continues until a subsequent image signal readout period to the vertical blanking period is finished.

Figure 2:
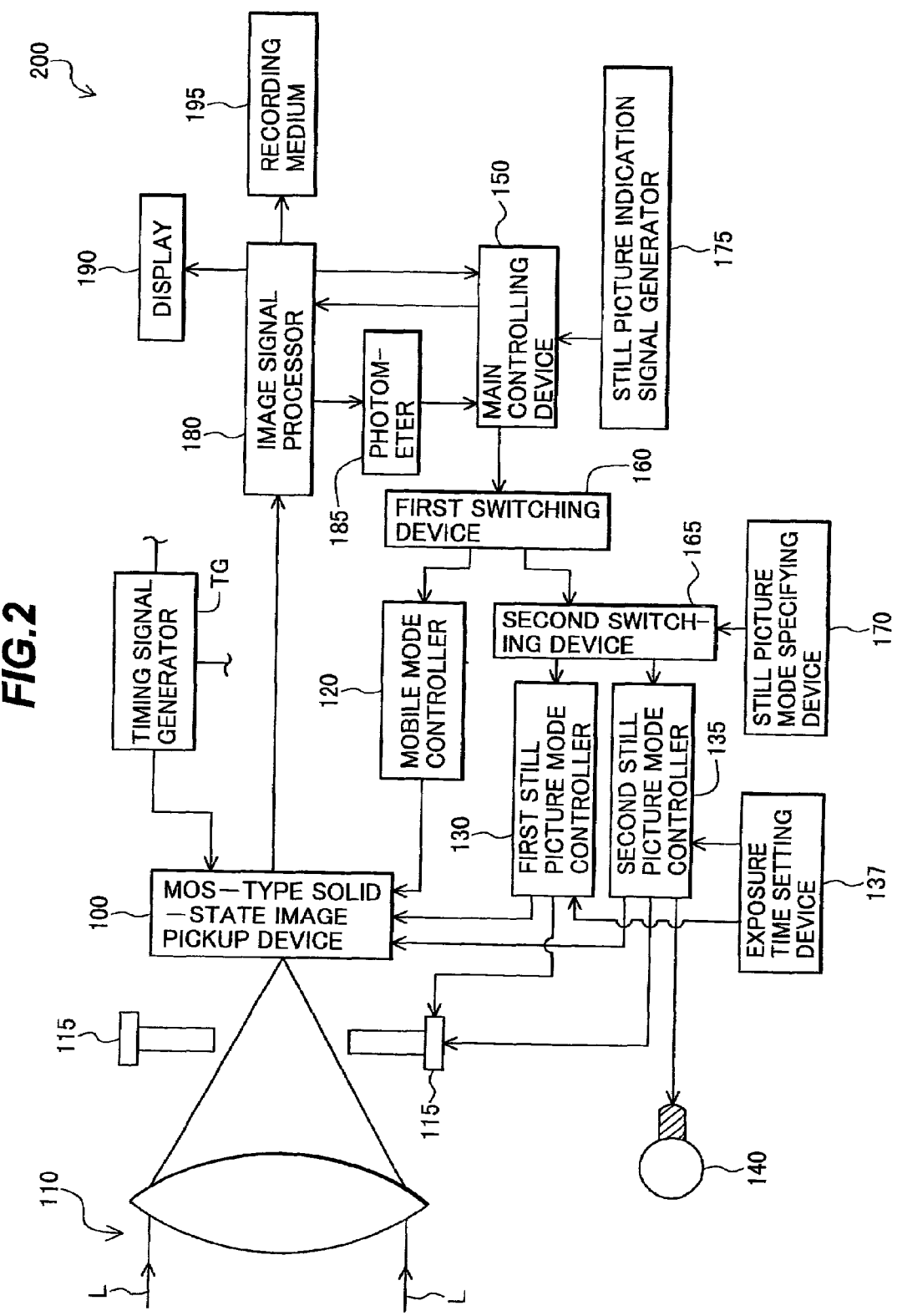
FIG. 2 is a block diagram showing an outline of a digital camera according to an embodiment.
Figure 6A:
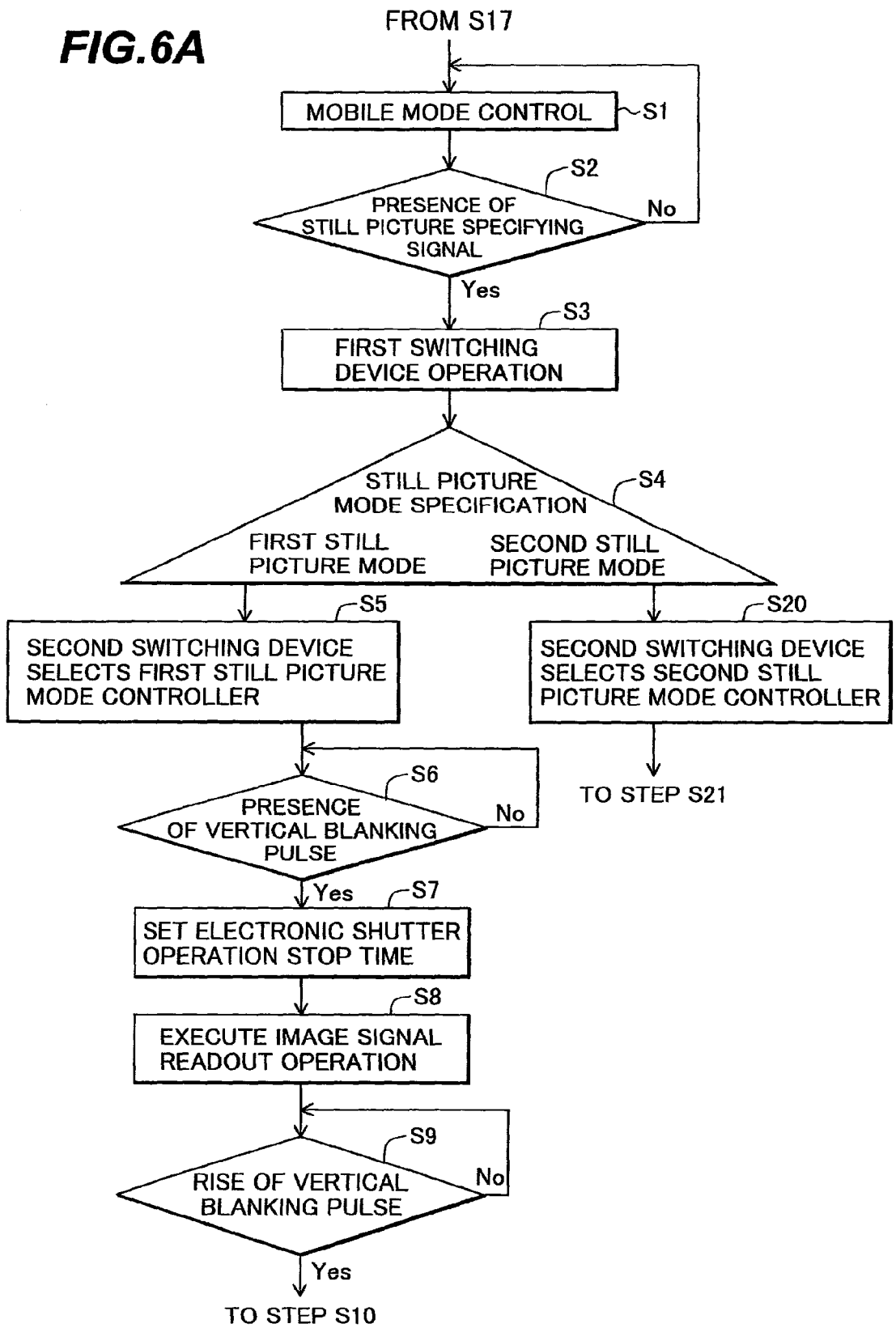
FIG. 6A is a flowchart schematically showing part of control operation in the digital camera shown in FIG. 2.
Figure 7A:
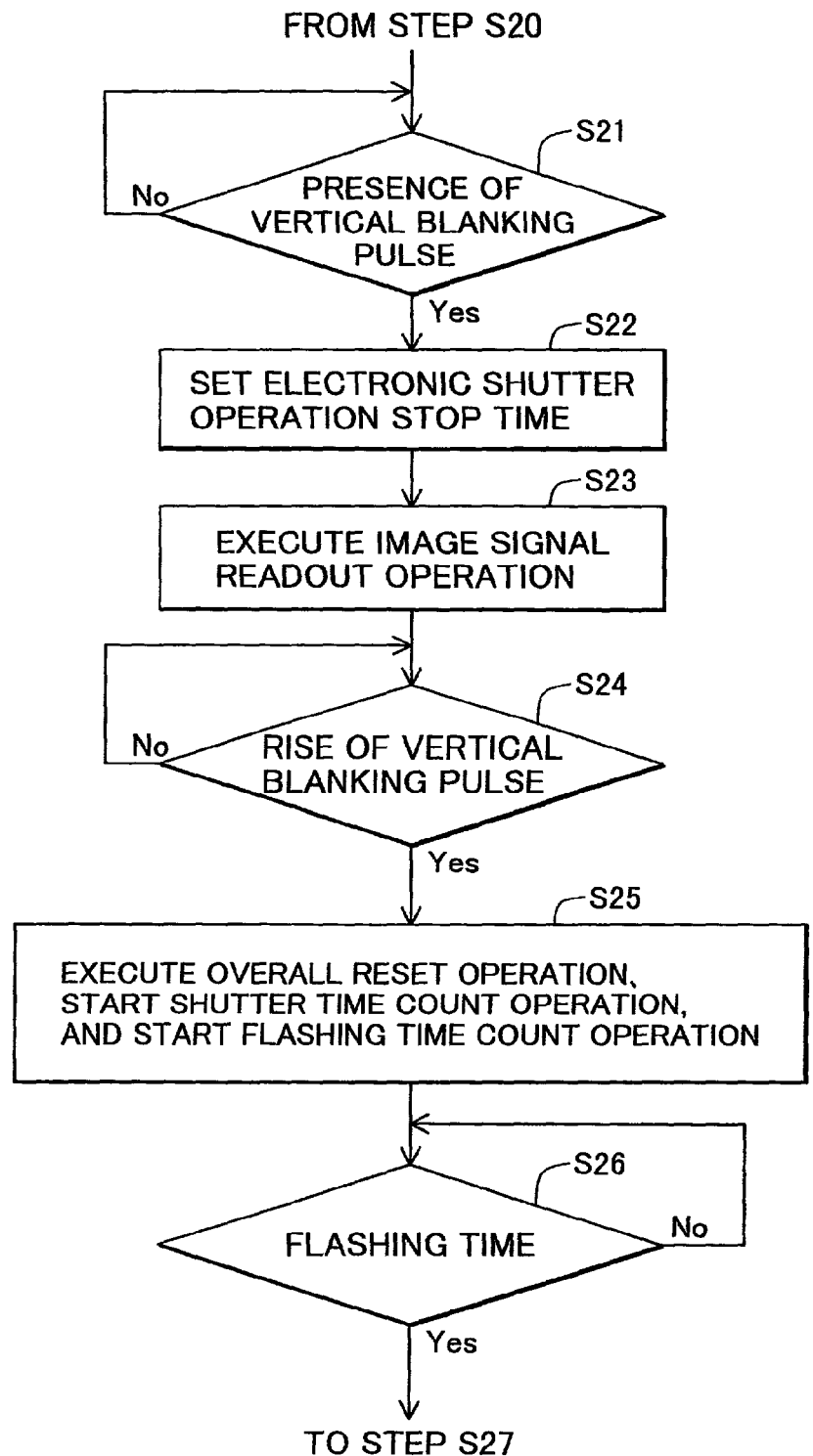
FIG. 7A is a flowchart schematically showing still another part of control operation in the digital camera shown in FIG. 2.

FIG. 2 shows an outline of a digital camera according to an embodiment in a block diagram. A digital camera 200 shown in FIG. 2 includes the solid-state image pickup device 100 shown in FIGS. 1A and 1B, an image pickup optical system 110, a light shielding device 115, a mobile picture mode controller 120, a first still picture mode controller 130, a second still picture mode controller 135, a strobe device 140, a main controlling device 150, a first switching device 160, a second switching device 165, a still picture mode specifying device 170, a still picture indication signal generator 175, an image signal processing device 180, a photometer 185, and a display 190. A recording medium 195 is disposed when necessary.

The optical system 110 produces a focused image on the MOS-type solid-state image pickup device 100. The device 100 converts the image focused by the optical system 110 into an image signal. The optical system 110 includes, for example, optical lenses, an iris, and an optical low-pass filter. In FIG. 2, one optical lens represents the image pickup optical system 110. in FIG. 2, light is indicated by arrows L.

The light shielding device 115 interrupts, when operated, light from entering the MOS-type solid-state image pickup device 100. The light shielding device 115 includes a shutter such as a mechanical shutter.

The mobile picture mode controller 120 drives the image pickup device 100 in a mobile picture mode and causes the image signal processing device 180 to produce mobile picture data. The image pickup device 100 is continually controlled by the mobile picture mode controller 120 to repeatedly conduct an image signal readout operation and an electronic shutter operation in an alternating fashion.

The first still picture mode controller 130 causes the image pickup device 100 to output one frame of still picture image signals without operating the strobe device 140 such as a stroboscopic lamp. The device 130 also causes the image signal processing device 180 to output still picture data according to the still picture image signals.

The second still picture mode controller 135 supplies a strobe device operating signal to the strobe device 140 and causes the image pickup device 100 to output one frame of still picture image signals. The device 135 operates the strobe device 140 and causes the image pickup device 100 to output one frame of still picture image signals for which backlight correction has been conducted. The device 135 causes the image signal processing device 180 to output still picture data according to the still picture image signals.

FIG. 3 is a signal timing chart for explaining a relationship between a vertical blanking pulse, a still picture indication signal, operation of the MOS-type solid-state image pickup device 100, an overall reset signal, operation of the light shielding device 115, a strobe device operation signal, and an output from the image signal processing device 180 when the digital camera 200 operates in a mobile picture mode under control of the mobile picture mode controller 120.

The vertical blanking pulse has a potential of, for example, about three volts (V). A continuous period of one vertical blanking pulse is one vertical blanking period. The length of the vertical blanking period in the mobile picture mode is, for example, about one millisecond (ms).

A period of time from when one vertical blanking pulse falls to when one subsequent vertical blanking pulse rises is one image signal readout period. During this readout period, horizontal scanning period and horizontal blanking period are mutually set. The total number of the horizontal scanning periods is the same as the number of the pixel rows. For example, for 500 pixel rows, one horizontal scanning period is about 60 odd microseconds (μs), one horizontal blanking period is about ten odd μs, and one image signal readout time is about 30 ms.

As indicated by one solid line for each case in FIG. 3, the still picture indicating signal, the overall reset signal, and the strobe device operating signal are not outputted. The overall reset operation AR is not conducted. The light shielding device 115 is not operated, namely, is kept opened. In FIG. 3, a state in which the light shielding device 115 is not operating is indicated as "open". This also applies to FIGS. 4 and 5, which will be described later.

Thick solid lines G1 to G4 indicate timing for the image signal readout operation and thin solid lines ES1 to ES4 indicate timing for the electronic shutter operation in the MOS-type solid-state image pickup device 100. In the diagram, "first row" indicates the first pixel row and "last row" indicates the last pixel row (the eighth pixel row). Intermediate positions therebetween indicate associated intermediate pixel rows. The first pixel row is a pixel row, for example, nearest to the image signal outputting device 50 and the last pixel row is a pixel row, for example, farthest to the image signal outputting device 50. This also applies to FIGS. 4 and 5.

The MOS-type solid-state image pickup device 100 repeatedly conducts the image signal readout operation G and the electronic shutter operation ES in an alternating way to sequentially output an image signal for a mobile picture. Horizontal distance from the electronic shutter operation ES to a subsequent image signal readout operation G indicates a period of exposure time.

The image signal processing device 180 outputs mobile picture data AD1 according to the image signal outputted from the image pickup device 100 through the image signal readout operation G1 and outputs mobile picture data AD2 according to the image signal outputted from the image pickup device 100 through the image signal readout operation G2. Similarly, the device 180 outputs mobile picture data AD3 according to the image signal outputted from the image pickup device 100 through the image signal readout operation G3 and outputs mobile picture data AD4 according to the image signal outputted from the image pickup device 100 through the image signal readout operation G4. No still picture data is outputted.

The mobile picture data from the image signal processing device 180 is fed, for example, to the display 190. The display 190 then displays a mobile picture reproduced using the mobile picture data. Or, the mobile picture data is fed to the storage medium 195 to be stored thereon.

Shooting of a still picture by the digital camera 200 is conducted under the first or second still picture mode controller 130 or 135. When the camera 200 is operated under control of the first still picture mode controller 130, still picture data can be obtained without operating the strobe device 140 such as a stroboscopic lamp.

FIG. 4 is a signal timing chart for explaining a relationship between a vertical blanking pulse, the still picture indication signal, operation of the MOS-type solid-state image pickup device 100, an overall reset signal, operation of the light shielding device 115, a strobe device operation signal, and an output from the image signal processing device 180 when the digital camera 200 operates under control of the first still picture mode controller 130.

In FIG. 4, the same items as those shown in FIG. 3 are indicated by the same terms or symbols employed in FIG. 3 and description thereof will be avoided.

In a state in which the still picture mode specifying device 170 specifies the first still picture mode controller 130, when the still picture indication signal generator 175 is operated to output a still picture indication signal SP, the first still picture mode controller 130 starts control operation. The device 175 includes, for example, a shutter button.

The control operation of the first still picture mode controller 130 is conducted for a first electronic shutter operation after the output of the still picture indication signal SP, i.e., an electronic shutter operation ES2 started during an image signal readout period H1, an image signal readout operation G3 which is executed during a still picture signal readout period H2 set after the image signal readout period H1, and an electronic shutter operation ES3. The control operation by the controller 130 is also conducted for an image signal readout operation G2, an overall reset operation, the light shielding device 115, and the image signal processing device 180.

The image signal readout operations G1 and G4 and the electronic shutter operations ES1 and ES4 are controlled by the mobile picture mode controller 120. The image signal readout operation G2 may also be controlled by the mobile picture mode controller 120.

The first still picture mode controller 130 executes the image signal readout operation G2 in almost the same fashion as for the mobile picture control operation and stops the electronic shutter operations ES2 and ES3. The controller 130 generates the overall reset signal R at a point of time $T_1$ during a vertical blanking period V1 set between the image signal readout period H1 and the still picture signal readout period H2. The overall reset operation AR is conducted at time $T_1$. The controller 130 operates the light shielding device 115 at time $T_2$ during the vertical blanking period V1 to prevent incidence of light to the MOS-type solid-state image pickup device 100.

In FIG. 4, a state in which the light shielding device 115 prevents incidence of light is indicated as "closed". This also applies to FIG. 5.

The image signal readout operation G3 conducted during the still picture image signal readout period H2 may be an image signal readout operation based on the interlaced scanning, high-speed thinning-out scanning, or the like. However, the operation G3 is favorably an image signal readout operation based on the progressive scanning. This also applies even when the image signal readout operations G1 and G2 before the readout operation G3 are image signal readout operations based on the interlaced scanning or high-speed thinning-out scanning.

The image signal processor 180 produces still picture data SD1 according to the image signal outputted from the image pickup device 100 through the image signal readout operation G3. The processor 180 produces mobile picture data AD1, AD2, and AD3 according to the image signal outputted from the image pickup device 100 through the other image signal readout operations G1, G2, and G4, respectively. The processor 180 does not produce mobile picture data AD3 according to the image signal outputted from the image pickup device 100 through the image signal readout operation G3. However, the digital camera 200 may be constituted to produce the mobile picture data AD3.

The first still picture mode controller 130 restores thereafter the light shielding device 115 to "open" at predetermined time $T_3$ during a vertical blanking period V2 set succeeding the still picture image signal readout period H2.

A period of time from when the overall reset operation AR is conducted to when the light shielding device 115 becomes "closed" is the exposure time for the photoelectric converter elements 20. Therefore, the shutter time is set to an identical point of time for all pixels 10. Even when an object to be shot by the camera 200 is moving at a high speed, a still picture can be produced without blur.

The period of exposure time may be fixed or variable and ranges, for example, from about one millisecond to several hundred of milliseconds. The length of the vertical blanking period V1 varies according to the period of exposure time. Since the exposure time ranges from about one ms to about 30 ms in the mobile picture mode, the exposure time can be set to a longer value.

When it is desired to have a variable exposure time in the still picture mode, for example, an exposure time setting device 137 (FIG. 2) is disposed in the digital camera 200. The exposure time setting device 137 includes a dial switch to be operated by the user of the camera 200, a jog dial switch to be operated by the user of the camera 200, or a selection switch for the user to select a value of exposure time by visually checking a monitor display.

When the exposure time setting device 137 sets the exposure time, information of the exposure time is supplied to the first and second still picture mode controllers 130 and 135 such that operation timing of the light shielding device 115 is changed for the exposure time set by the device 137.

Or, the main controlling device 150 calculates an optimal value of exposure time according to information from the photometer 185 and then the first and second still picture mode controllers 130 and 135 changes operation timing of the light shielding device 115 for the exposure time.

When the still picture indication signal SP is outputted before the time at which the electronic shutter operation ES2 is to be started after the image signal readout operation G2 is started, the first still picture mode controller 130 may conduct almost the same control operation as described above.

When the digital camera 200 operates under control of the second still picture mode controller 135, still picture data of an object undergone backlight correction can be produced by operating the strobe device 140 such as a stroboscopic lamp.

FIG. 5 is a signal timing chart for explaining a relationship between a vertical blanking pulse, a still picture indication signal, operation of the MOS-type solid-state image pickup device 100, an overall reset signal, operation of the light shielding device 115, a strobe device operation signal, and an output from an image signal processor 180 when the digital camera 200 operates under control of the second still picture mode controller 135.

In FIG. 5, the same items as those shown in FIG. 4 are indicated by the same terms or symbols employed in FIG. 4 and description thereof will be avoided.

In a state in which the still picture mode specifying device 170 specifies the second still picture mode controller 135, when the still picture indication signal generator 175 is operated to output a still picture indication signal SP, the second still picture mode controller 135 starts control operation.

The control operation of the second still picture mode controller 135 is conducted for a first electronic shutter operation after the output of the still picture indication signal SP, i.e., an electronic shutter operation ES2 started during an image signal readout period H1, an image signal readout operation G3 which is executed during a still picture signal readout period H2 set after the image signal readout period Hi, and an electronic shutter operation ES3. The control operation by the controller 135 is also conducted for an image signal readout operation G2, an overall reset operation, the light shielding device 115, and the image signal processor 180.

The image signal readout operations G1 and G4 and the electronic shutter operations ES1 and ES4 are controlled by the mobile picture mode controller 120. The image signal readout operation G2 may also be controlled by the mobile picture mode controller 120.

The second still picture mode controller 135 executes the image signal readout operation G2 in almost the same fashion as for the mobile picture control operation and stops the electronic shutter operations ES2 and ES3, and causes a strobe device operating signal FP to be generated at a point of time $t_1$ during a vertical blanking period V1. A difference of time between time $T_1$ and time $t_1$ is, for example, about 10 μs. The other control operations are the same as those of the first still picture mode controller 130.

Since the strobe device operation signal FP is outputted, the strobe device 140 such as a stroboscopic lamp can be operated, for example, from time $t_1$ to time $t_2$ during the vertical blanking period V1. The period of light emission of the strobe device 140 depends on performance thereof and ranges, for example, from about several tens of microseconds to several milliseconds. The exposure time (the difference between time $T_2$ and time $T_1$) ranges, for example, from about one millisecond to about several hundred milliseconds. The vertical blanking period V1 ranges, for example, from about several milliseconds to about several hundred milliseconds.

There can be produced still picture data undergone backlight correction. Even if an object is moving at a high speed, a still picture thereof can be produced without any blur.

When the still picture indication signal SP is outputted before the time at which the electronic shutter operation ES2 is to be started after the image signal readout operation G2 is started, the second still picture mode controller 135 may conduct almost the same control operation as described above.

The solid-state image pickup device 100 operates, for example, as follows in the image signal readout operation, the electronic shutter operation, and the overall reset operation.

Description will be given of the operation by referring to FIGS. 1A and 1B. For convenience of description, the pixel rows are numbers as a first pixel row 11, a second pixel row 11, . . . , a seventh pixel row 11, and an eighth pixel row beginning at a position thereof next to the image signal outputting device 50. The output transistor 21, the reset transistor 23, the row selection transistor 22, the reset signal line 28, and the row selection line 27 for an n-th pixel row (n is an integer ranging from one to eight) are represented with "n-th" before their names, respectively. The photoelectric converter element for the n-th pixel row 11 is expressed with "n-th row" before its name.

When an image signal readout period starts, the controller 60 supplies a predetermined control signal to the readout row-shifter 43. In response to the signal, the row-shifter 43 outputs a predetermined signal to each control signal generator 48 at predetermined timing. The control signal generators 48 supply row selection signals to the associated first to eighth row selection lines 27 in a predetermined order. An image signal readout operation starts.

When the row selection signal is fed to an n-th row selection signal line 27, the n-th row selection transistors 22 turn on. The n-th output transistors 21 are electrically connected to the associated constant-voltage supply line 25 and the associated output signal line 30.

Analog voltage signals representing a quantity of electric charge accumulated in the n-th row photoelectric converter elements appear respectively on the associated output signal lines 30.

The controller 60 supplies a predetermined control signal to the analog signal generator 53 to control the sampling transistors such that the analog voltage signals on the output signal lines are held respectively by the associated capacitors.

The controller 60 then controls the reset row-shifter 45 such that the control signal generator 48 supplies a reset signal to an n-th reset signal line 28. In response thereto, the n-th reset transistors 23 turn on. Electric charge accumulated in the n-th row photoelectric converter elements 20 are discharged to the associated constant-voltage supply line 25. That is, the n-th row photoelectric converter elements 20 are reset. The n-th row photoelectric converter elements 20 can start accumulating electric charge after the supply of the reset signal is stopped.

The controller 60 controls the row-directional shifter 55, which in turn controls the analog signal generator 53 to output each analog voltage signal from the analog signal generator 53. In other words, an image signal representing a quantity of electric charge accumulated in the photoelectric converter elements 20 is outputted in the pixel row unit.

The scanning type in image signal readout operations of the MOS-type solid-state image pickup device 100 in the mobile picture mode may be fixed or may be freely selected. For the selective operations, a selector to select such scanning type is added to the digital camera 200. This also applies to the scanning type in image signal readout operations of the MOS-type solid-state image pickup device 100 in the still picture mode.

The image signal readout operation under the still picture mode control and that under the mobile picture mode control are independently conducted of each other and each thereof is conducted for either one of, for example, the progressive scanning, the interlaced scanning, and the thinning-out scanning.

For example, by sequentially conducting an operation to generate an output signal on an associated output signal line 30 and a reset operation to discharge accumulated electric charge in a range from the first pixel row 11 to the eighth pixel row 11 in the pixel row unit, one image signal readout operation based on the progressive scanning is completely achieved.

For example, by sequentially conducting an operation to generate an output signal on an associated output signal line 30 and a reset operation to discharge accumulated electric charge for every second pixel row in a ranges from the first pixel row 11 to the eighth pixel row 11 in the pixel row unit, one image signal readout operation based on the interlaced scanning is completely achieved.

For example, by sequentially conducting an operation to generate an output signal on an associated output signal line 30 and a reset operation to discharge accumulated electric charge, for example, for every at least third pixel row in a range from the first pixel row 11 to the eighth pixel row 11 in the pixel row unit, one image signal readout operation based on the thinning-out scanning is completely achieved.

The image signal readout operation can also be conducted without the reset operation. Whether or not the reset operation is executed in association with the image signal output operation can be appropriately selected. When the reset operation is not required, the electronic shutter operation must be conducted at least under the mobile mode control.

To set the exposure time of each photoelectric converter element 20 to a predetermined period of time, the electronic shutter operation is sequentially started at predetermined timing beginning at a pixel row 11 having completed the image signal readout operation. When the exposure time is equal in time to one image signal readout period, the reset operation in the image signal readout operation is the electronic shutter operation.

When the exposure time is shorter than one image signal readout period, the electronic shutter operation is conducted at timing other than timing of the reset operation in the image signal readout operation. The electronic shutter operation itself is the same as the reset operation in the image signal readout operation. One electronic shutter operation starts at a point during one image signal readout operation and ends at a point during a vertical blanking period following the image signal readout period or during a succeeding image signal readout period.

The overall reset operation is conducted during a desired vertical blanking period. Having received a predetermined signal from the controller 60, the overall reset controller 47 outputs an overall reset signal to each control signal generator 48. Each of the generators 48 sends a reset signal to the associated reset signal line 28 at a time. Electric charge accumulated in the photoelectric converter elements 20 are discharged to the associated constant-voltage supply line 25 at a time.

All or part of the mobile picture mode controller 120, the first still picture mode controller 130, and the second still picture mode controller 135 can be integrally formed on the pertinent semiconductor chip together with the MOS-type solid-state image pickup device 100. The main controlling device 150 can also be integrally formed on the semiconductor chip.

In addition to the controller 60 of the image pickup device 100 and the main controlling device 150 of the digital camera 200, one to three controlling devices may be disposed to achieve the mobile picture mode control and/or the still picture mode control.

The main controlling device 150 includes, for example, a central processing unit (CPU).

The switching the mobile mode control by the mobile mode controller 120 to the still picture mode control by the first or second still picture mode controller 130 or 135 is conducted by the first switching device 160 when the still picture indication signal generator 175 including, for example, a shutter button outputs a still picture indication signal.

The first switching device 160 includes, for example, a flip-flop circuit and a logic circuit.

Switching to the first or second still picture mode controller 130 or 135 in response to the still picture indication signal can be specified with the still picture mode specifying device 170 by the user of the digital camera 200 in advance. It is also possible to set in the initialization that, for example, the first still picture mode controller 130 is to be selected.

When the still picture indication signal generator 175 is operated and outputs a still picture indication signal, the control operation is changed to a control operation by a still picture mode controller beforehand specified by the still picture mode specifying device 170.

The still picture mode specifying device 170 includes, for example, a switch button of a mode selector to be operated by the user of the digital camera 200 or a menu selection switch for the user to select a mode by visually checking a menu display.

The second switching device 165 includes, for example, a mode selector disposed on a camera body, a flip-flop circuit, and a logic circuit.

The control switching from the control by the mobile picture mode controller 120 to the control by the first or second still picture mode controller 130 or 135 is conducted in quite a short period of time required for the shooting of a still picture. The first switching device 160 then switches the control to the control by the mobile picture mode controller 120.

The image signal processor 180 receives an image signal sent from the MOS-type solid-state image pickup device 100 and conducts various processing such as interpolation and data compression for the received data to produce a predetermined kind of image data (mobile or still picture data). The processor 180 sends information such as quantity of the produced image data, a termination signal in each step of the image signal processing, and an error signal therein to the main controlling device 150.

The photometer 185 receives a predetermined signal, for example, a luminance signal from the image signal processor 180 and produces a numeric value for an exposure condition at shooting. For example, center-intensive photometry and multi-divided photometry are well known as photometry. The photometer 185 supplies the numeric exposure condition to the main controlling device 150.

The main controlling device 150 selects or determines an exposure condition using the value received from the photometer 185 and sends the exposure condition to the mobile picture mode controller 120. To set the exposure condition within an optimal range or to be nearest to an optimal range, the controller 120 conducts an auto exposure (AE) operation to change timing of the start point of the electronic shutter operation. Under the mobile picture mode control, the AE operation is desirably conducted in a successive way.

The digital camera 200 may be constituted so that the exposure condition selected by the main controlling device 150 is sent also to the first and second still picture mode controllers 130 and 135. It is then possible that the first and second still picture mode controllers 130 and 135 conduct AE operation to change timing of the start point of the electronic shutter operation to set the exposure condition within an optimal range or to be nearest to an optimal range.

The mobile picture data output from the image signal processor 180 is sent, for example, to the display 190. Using the mobile picture data, the display 190 reproduces a mobile picture. Or, compressed image data obtained by compressing the mobile picture data is sent to the recording medium 195 to be stored thereon. This also applies to the still picture data generated by the image signal processor 180.

The display 190 includes, for example, a liquid crystal display, an electro luminescence (EL) display, a plasma display, or a cathode-ray tube.

The recording medium 195 is, for example, a nonvolatile memory such as a memory card, a memory stick, and a compact flash memory; a memory tape; a memory disk; a floppy disk; a hard disk; a magnetooptical recording medium; or an optical recording medium such as a digital video disk read-only memory (DVD-RAM), a recordable compact disk (CD-R), a rewritable compact disk (CD-RW), or the like.

A timing signal generator TG is disposed at a desired point in the digital camera 200. The timing signal generator TG generates timing signals to keep appropriate timing in the operations of the respective devices in the digital camera 200 and sends the timing signals to the MOS-type solid-state image pickup device 100, the image signal processor 180, and the like.

FIGS. 6A, 6B, 7A and 7B are flowcharts schematically showing the control of operations in the digital camera 200.

Step S1 entirely indicates the mobile picture mode control by the mobile mode controller 120. In the digital camera 200, the mobile picture mode control is continually conducted.

In step S2, a check is made to determine whether or not a still picture indication signal has appeared. If the signal has not appeared, process returns to step S1. If the signal has appeared, process goes to step S3.

In step S3, the first switching device 160 operates to switch the operation from the mobile picture mode control to the still picture mode control.

In step S4, a mode specified by the still picture mode specifying device 170 is identified. If the first still picture mode is specified, process goes to step S5. If the second still picture mode is specified, process goes to step 20.

In step S5, the second switching device 165 selects the first still picture mode controller 130. The controller 130 starts control, and process goes to step S6.

In step S6, a check is made whether or not a vertical blanking pulse has been generated. This check is continuously made until a vertical blanking pulse is generated. When the vertical blanking pulse is generated, process goes to step S7.

In step S7, a period during which the electronic shutter operation is stopped is set. The electronic shutter operation is kept stopped throughout the period set in step S7.

In step S8, an image signal readout operation is executed during an image signal readout period following a vertical blanking period defined by a vertical blanking pulse as a reference of the timing for transition from step S6 to step S7. An image signal produced by the image pickup device 100 through the image signal readout operation is used to generate mobile picture data.

In step S9, a check is made to determine whether or not a vertical blanking pulse has risen after the vertical blanking pulse as a reference of transition timing from step S6 to step S7. The check is repeatedly conducted until the vertical blanking pulse rises. When the vertical blanking pulse rises, process goes to step S10.

In step S10, the overall reset operation is conducted. To determine a period of time for shutter operation, namely, an operation start time and an operation release time of the light shielding device 115, a count operation of clock pulses is started.

In step S11, a check is made to determine whether or not the operation start time of the light shielding device 115 has come. The check is repeatedly conducted until the operation start time of the light shielding device 115 comes. If the operation start time of the light shielding device 115 come, process goes to step S12.

In step S12, the light shielding device 115 is operated. Light is prevented from entering the image pickup device 100.

In step S13, a check is made to determine whether or not the vertical blanking pulse as a reference of transition timing from step S9 to step S10 has fallen. The check is repeatedly conducted until the vertical blanking pulse falls. When the vertical blanking pulse falls, process goes to step S14.

In step S14, an image signal readout operation is executed. An image signal produced by the image pickup device 100 through the image signal readout operation is used to generate still picture data.

In step S15, a check is made to determine whether or not a vertical blanking pulse has risen after the vertical blanking pulse as a reference of transition timing from step S13 to step S14. The check is repeatedly conducted until the vertical blanking pulse rises. When the vertical blanking pulse rises, process goes to step S16.

In step S16, the operation of the light shielding device 115 activated in step S12 is released. Light enters the image pickup device 100. Step S16 is executed during a vertical blanking period defined by the vertical blanking pulse as a reference of transition timing from step S15 to step S16.

In step S17, a restart point of time is set for the electronic shutter operation. The mobile picture mode controller 120 starts the electronic shutter operation at timing of the restart point of time.

When step S17 is finished, process returns to step S1. That is, the operation is returned from the control of the first still picture mode controller 130 to the mobile mode control.

When the still picture mode identified in step S4 is the second still picture mode, process goes from step S4 to step S20.

In step S20, the second switching device 165 selects the second still picture mode controller 135. The controller 135 starts the control operation. Steps S21 to S24 similar to steps S6 to S9 described above are sequentially executed, and the process goes to step S25.

In step S25, the overall reset operation is executed. To determine a period of time for shutter operation, namely, an operation start time and an operation release time of the light shielding device 115, a count operation of clock pulses is started. To determine a flashing time of the strobe device 140, namely, an operation time of the strobe device 140, a count operation of clock pulses is started.

In step 326, a check is made to determine whether or not the operation time of light shielding device 115 has come. The check is repeatedly conducted until the operation time comes. When the operation time comes, process goes to step S27.

In step S27, a strobe device operating signal is outputted. The strobe device 140 operates.

Steps S28 to S34 similar to steps S11 to S17 described above are then sequentially executed.

When step S34 is finished, process returns to step S1. That is, the operation is returned from the control of the second still picture mode controller 135 to the mobile mode control.

In the digital camera 200, when the still picture mode specifying device 170 specifies the first still picture mode controller 130, even if an object to be shot by the camera 200 is moving at a high speed, a still picture thereof can be produced without any blur. When the still picture mode specifying device 170 specifies the second still picture mode controller 135, still picture data undergone backlight correction can be produced, and even if an object to be shot by the camera 200 is moving at a high speed, a still picture thereof can be produced without any blur.

The light shielding device 115 of the digital camera 200 need only conduct one light shielding operation and one opening operation during a relatively long period of time. Therefore, when the light shielding device 115 is composed of a mechanical shutter, it is not necessary that the mechanical shutter have particularly high performance. Since an inexpensive mechanical shutter is available, the digital camera 200 can readily become also inexpensive.

Figure 8:
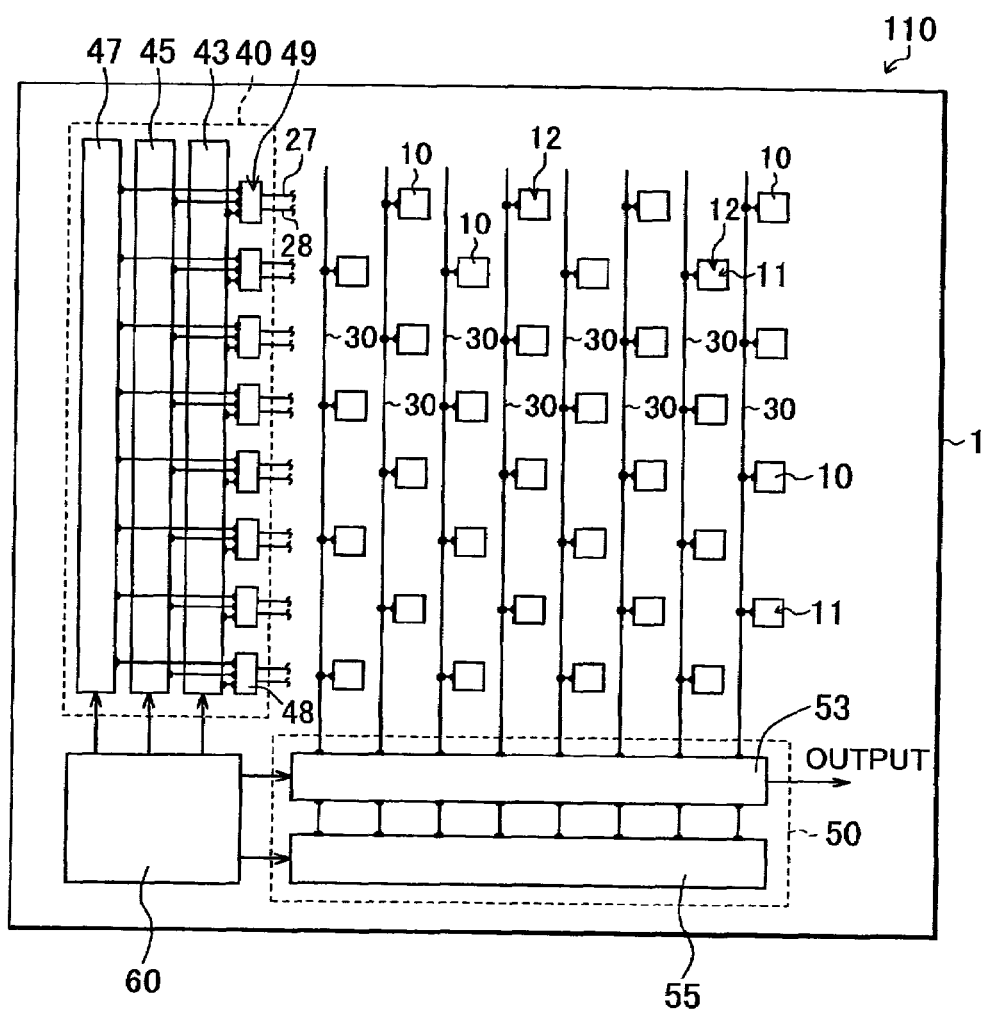
FIG. 8 is a plan view schematically showing a MOS-type solid-state image pickup device according to another embodiment.

FIG. 8 schematically shows, in a plan view, a MOS-type solid-state image pickup device according to another embodiment. In the MOS-type solid-state image pickup device 110 shown in FIG. 8, 32 pixels 10 are arranged in an array with eight rows and eight columns in a shifted-pixel layout. Excepting this point, the image pickup device 110 is almost equal in structure and operation to the image pickup device 100 shown in FIG. 1A.

Therefore, the same constituent components shown in FIG. 8 as those shown in FIG. 1A are assigned with the same reference numerals and description thereof will be avoided.

In this specification, the "shifted-pixel layout" indicates that in an arrangement of a large number of pixels, each photoelectric converter element in even pixel columns is shifted in a direction of the column relative to associated one of the photoelectric converter elements of the odd pixel columns by about one half of a pitch $P_1$ of the photoelectric converter elements of each pixel column. Each photoelectric converter element in even pixel rows is shifted in a direction of the row relative to associated one of the photoelectric converter elements of odd pixel rows by about one half of a pitch $P_2$ of the photoelectric converter elements of each pixel row. Each pixel row includes photoelectric converter elements of only odd or even photoelectric converter columns. The pitches $P_1$ and $P_2$ may be equal to each other or may be different from each other.

Additionally, "about one half of a pitch $P_1$ of the photoelectric converter elements" indicates, in addition to $P_1/2$, any value which differs from $P_1/2$ due to factors such as a manufacturing error, a rounding error of the pixel position in the design or the mask process and which however can be regarded substantially as equal to $P_1/2$ in consideration of performance of a pertinent solid-state image pickup device and picture quality thereof. This also applies to "about one half of a pitch $P_2$ of the photoelectric converter elements" in this specification.

In MOS-type solid-state image pickup device 110 shown in FIG. 8, one pixel row 11 includes only photoelectric converter elements 20 of odd or even pixel columns. Therefore, the output signal lines 30 may be disposed for every second pixel columns 12.

In both of a case in which the output signal line 30 is disposed for each pixel column 12 and a case in which the output signal line 30 is disposed for every second pixel column 12, each output signal line 30 is electrically connected to the output transistor of one pixel 10 in each pixel row 11.

Figure 9:
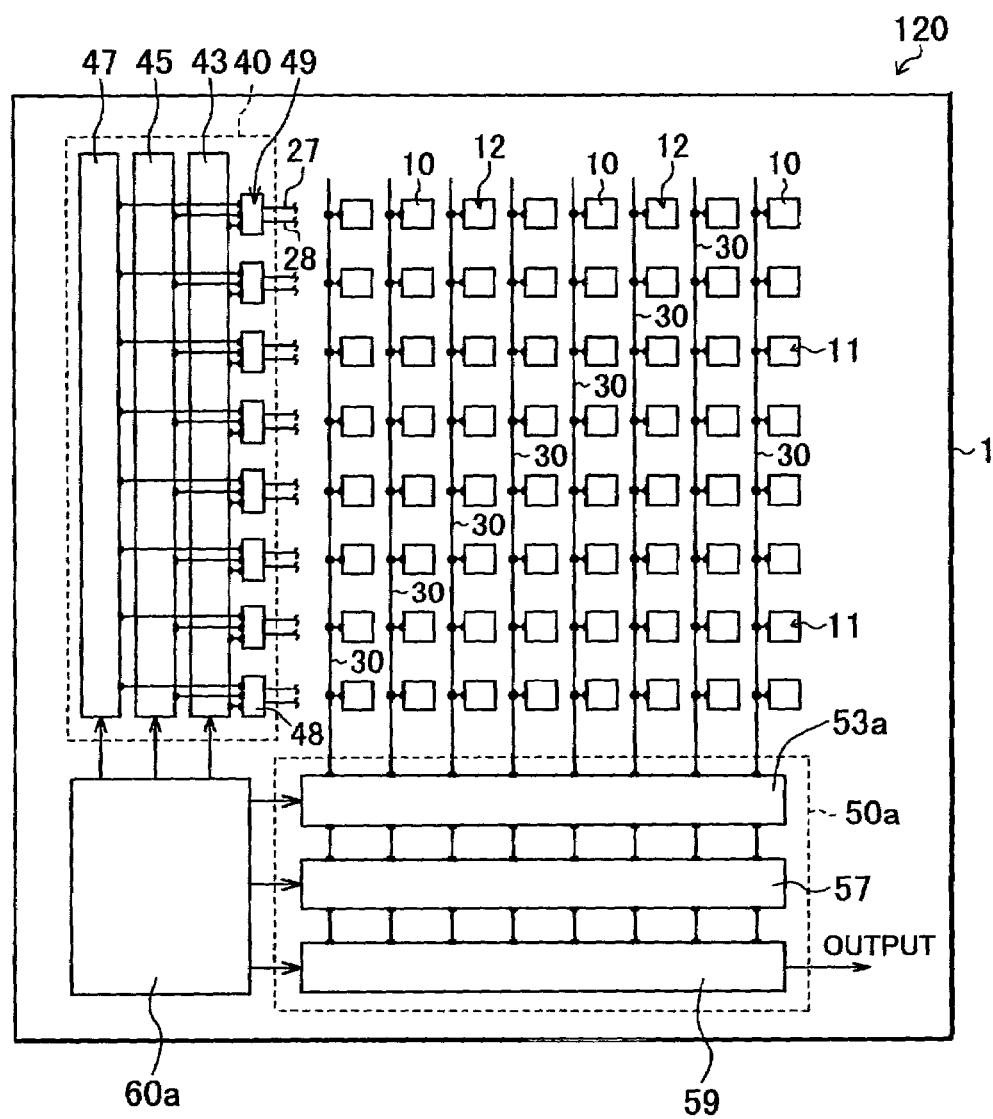
FIG. 9 is a plan view schematically showing a MOS-type solid-state image pickup device according to still another embodiment.

FIG. 9 shows, in a schematic plan view, a MOS-type solid-state image pickup device according to still another embodiment. The MOS-type solid-state image pickup device 120 shown in FIG. 9 remarkably differs from the MOS-type solid-state image pickup device 100 shown in FIG. 1A in that the image signal outputting device includes an analog signal generator 53a, an A/D conversion device 57, and a buffer memory 59. Accordingly, the controller is slightly changed in its function. Excepting these points, the pickup devices 120 and 100 are almost equal in constitution to each other.

Therefore, the same constituent components of FIG. 9 as those of FIG. 1A are assigned with the same reference numerals and description thereof will be avoided. The image signal outputting device is assigned with a new reference numeral of 50a and the controller is assigned with a new reference numeral of 60a.

Like the analog signal generator 53 shown in FIG. 1A, the analog signal generator 53a includes, for example, load transistors, capacitors, sampling transistors, and sampling signal line connected to control terminals (gates) of the sampling transistors.

An analog voltage signal held by the capacitor is fed to the A/D conversion device 57.

The A/D conversion device 57 includes many (eight) A/D converters. One A/D converter is arranged for each capacitor of the analog signal generator 53a. Each AND converter receives an analog voltage signal from the associated capacitor, converts the signal into a digital signal, and outputs the signal to the buffer memory 59. The signals constitute an image signal.

The buffer memory 59 temporarily holds the digital signal sent from each A/D converter and then outputs the signal to an external device. The buffer memory 59 can be composed, for example, of a semiconductor memory device such as a dynamic random access memory (DRAM) or a static random access memory (SRAM).

The controller 60a controls operations of the readout row-shifter 43, the reset row-shifter 45, and the overall reset controller 47 as well as operations of the analog signal generator 53a, the AND conversion device 57, and the buffer memory 59.

When the image signal outputting device includes an A/D converter, the MOS-type solid-state image pickup device can produce a digital output signal.

When the pixels 10 are arranged in the shifted-pixel layout and one output signal line 30 is disposed for each pixel column 12, one A/D converter may be connected to each set of two adjacent output signal lines 30.

Or, only one A/D converter may be connected to an output port of the analog signal generator 53 shown in FIG. 1.

Figure 10:
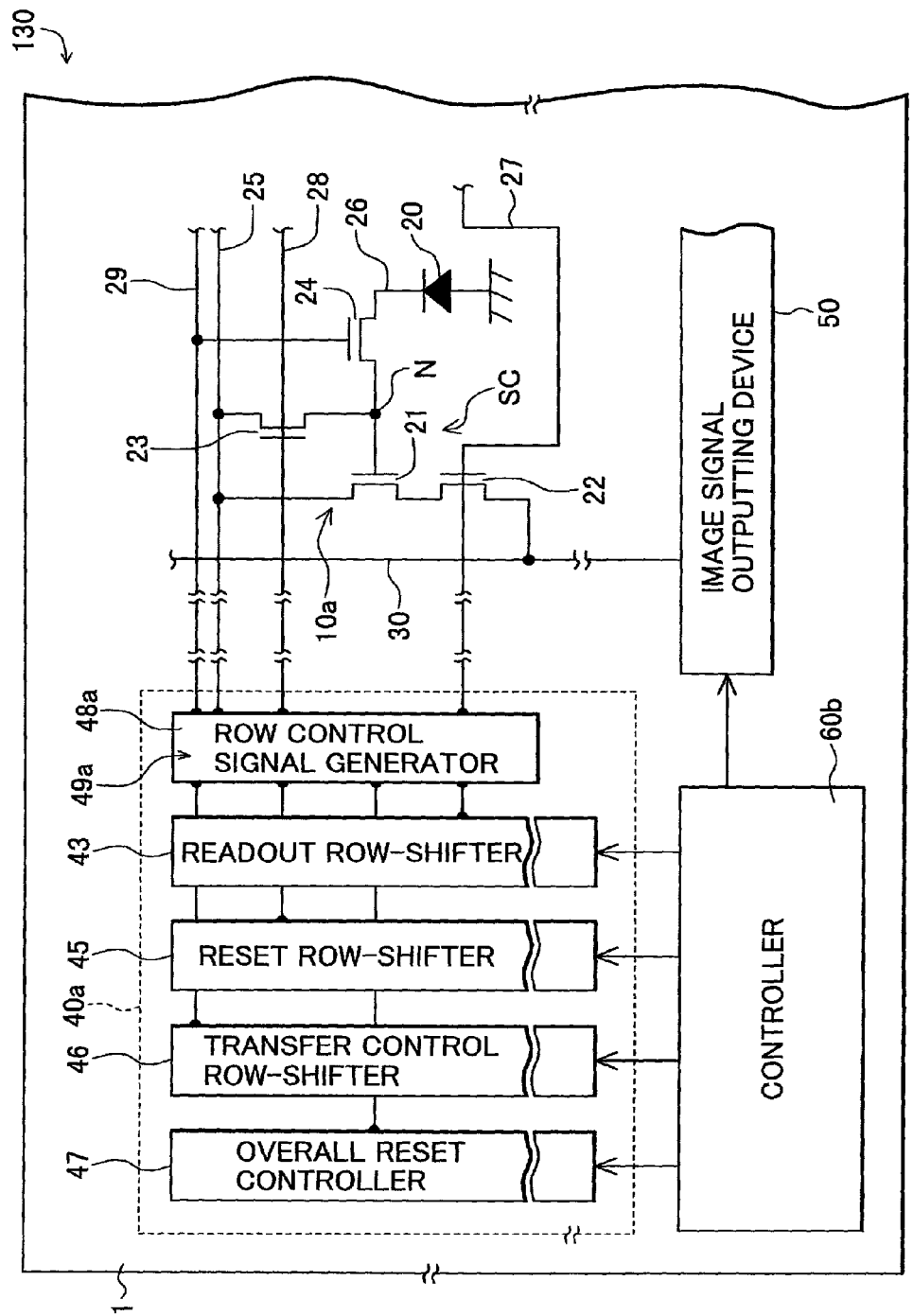
FIG. 10 is a plan view schematically showing a MOS-type solid-state image pickup device according to still another embodiment.

FIG. 10 schematically shows, in a plan view, a MOS-type solid-state image pickup device according to further another embodiment. In the MOS-type solid-state image pickup device 130 shown in FIG. 10, the switching circuit SC of each pixel includes an output transistor 21, a row selection transistor 22, a reset transistor 23, and a charge transfer transistor 24. In association therewith, the image pickup device 130 additionally includes one transfer signal line 29 for each pixel row and a transfer control row-shifter 46 in the column-directional shifter. In association with addition of the transfer control row-shifter 46, the control signal generators and the controller are slightly changed in their functions.

Excepting these points, the pickup devices 130 and 100 are almost equal in constitution to each other. Therefore, the same constituent components shown in FIG. 10 as those shown in FIGS. 1A and 1B are assigned with the same reference numerals and description thereof will be avoided.

But the pixel is assigned with a new reference numeral of 10a, the column-directional shifter is assigned with a new reference numeral of 40a, the control signal generator is assigned with a new reference numeral of 48a, the control signal generating unit is assigned with a new reference numeral of 49a, and the controller is assigned with a new reference numeral of 60b.

The charge transfer transistor 24 is placed at a position between the photoelectric converter 20 and a connecting point N between the line 26 and the reset transistor 23 and is connected via the line 26 to the associated photoelectric converter 20 and the output transistor 21. The charge transfer transistor 24 is, for example, a MOS transistor.

The control terminal (gate) of the transistor 24 is electrically connected to the associated transfer signal line 29. Structurally, part of the line 29 may serve as the gate electrode of the charge transfer transistor 24.

One transfer signal line 29 is disposed for each pixel row. Each line 29 extends along the associated pixel row.

The transfer signal line 29 is made of conductive material such as polycrystalline silicon, poly-cide, aluminum, tungsten, a tungsten alloy, molybdenum, or a molybdenum alloy. The line 29 is electrically insulated by electrically insulating layers, not shown, from the other wiring lines and the semiconductor substrate 1.

The transfer signal line 29 is connected at an end thereof to the associated control signal generator 48a. The generator 48a generates, on receiving a predetermined signal from the transfer control row-shifter 46, a transfer control signal and supplies the signal to the associated transfer signal line 29.

The transfer control row-shifter 46 generates a signal for each control signal generator 48a to generate a row selection signal in a predetermined order.

The controller 60b controls operations of the readout row-shifter 43, the reset row-shifter 45, the overall reset controller 47, and the image signal outputting device 50 as well as the transfer control row-shifter 46.

The transfer control row-shifter 46 includes, for example, (1) a shift register which receives as an input signal, for example, a control signal from the controller 60b and which conducts a shift operation under control of a horizontal sync pulse and (2) a logic circuit to change the way of a shift operation in response to an operation selecting signal specifying the shift operation at the image signal readout operation to a operation based on progressive, interlaced, or thinning-out scanning.

The image signal readout operation is executed, for example, as below.

First, a predetermined control signal generator 48a supplies a row selection signal to a row selection signal line 27 for the first pixel row. Each row selection transistor 22 associated with the line 27 turns on. Each associated output transistor 21 is electrically connected via the associated row selection transistor 22 to the output signal line 30.

Subsequently, a predetermined control signal generator 48a supplies a reset signal to a reset signal line 28 for the first pixel row. Each reset transistor 23 associated with the line 28 turns on, and unnecessary electric charge in the gate region of the output transistor 21 associated with the reset transistor 23 is discharged to the associated constant-voltage supply line 25.

After the reset signal is supplied, a predetermined control signal generator 48a supplies a transfer control signal to a transfer signal line 29 for the first pixel row. Each charge transfer transistor 24 associated with the line 29 turns on, and a voltage representing the electric charge accumulated in the associated photoelectric converter element 20 is applied to the gate of the output transistor 21. This changes an electrical resistance value of the output transistor 21. The output transistor 21 and a load resistance, for example, a load transistor in the analog signal generator 53 (FIG. 1) in the image signal outputting device 50 are electrically connected between the constant-voltage supply line 25 and ground to divide the constant voltage applied to the line 25. An output signal representing electric charge accumulated in each of the first column photoelectric converter elements 20 appears on each associated output signal line 30.

Thereafter, above-mentioned operation s are sequentially conducted for the second to the last pixel rows. The image signal readout operation is thereby finished.

When necessary, immediately after the output signal is generated on each output signal line 30 for one pixel row, electric charge accumulated in the photoelectric converters 20 of the pixel row is discharged to the constant-voltage supply line 25.

The electronic shutter operation is conducted, for example, as below. First, a predetermined control signal generator 48a supplies a reset signal to a reset signal line 28 for a pixel row (an n-th pixel row) to which electric charge is to be discharged. Each reset transistor 23 associated with the line 28 turns, on.

Next, a predetermined control signal generator 48a supplies a transfer control signal to a transfer signal line 29 for the n-th pixel row. Each charge transfer transistor 24 associated with the line 29 turns on, and electric charge accumulated in each n-th row photoelectric converter element 20 is discharged through the reset transistor 23 to an associated constant-voltage supply line 25. Each n-th row photoelectric converter element 20 is then reset.

In this situation, part of the electric charge may remains in the gate region of the associated output transistor 21. The electric charge is discharged to the constant-voltage supply line 25 in an initial stage of a subsequent image signal readout operation for the n-th pixel row. Therefore, in the next image signal readout operation for the n-th pixel row, the output signal dose not includes any electrical ingredient representing the electric charge.

The reset signal and the transfer control signal used to discharge the electric charge accumulated in the n-th row photoelectric converter elements may be separated in time from each other only if the reset signal is first supplied. Or, the reset signal and the transfer control may be overlapped with each other.

Thereafter, above-mentioned reset operations are sequentially conducted for the other pixel rows from which electric charge is to be discharged. The electronic shutter operation is thereby finished.

In the overall reset operation, the reset operation is conducted for all pixel rows at a time.

The digital camera 200 shown in FIG. 2 can be configured by using the image pickup device 110, 120, or 130 shown in FIGS. 8, 9, or 10 instead of the MOS-type solid-state image pickup device 100 shown in FIG. 1. Also when either one of the image pickup devices 110, 120, or 130 is used, it is not necessary to modify or to change the other constituent components.

Also when either one of the image pickup devices 100, 110, 120, and 130 is used, whether or not the second still picture mode controller 135 is disposed can be appropriately selected. If the controller 135 is not disposed, the strobe device 140 and the still picture mode specifying device 170 can be dispensed with.

Description has been given of a MOS-type solid-state image pickup device and a digital camera in the embodiments. However, the present invention is not limited to the embodiments.

For example, each pixel may be constituted by using one photoelectric converter element and one transistor.

Figure 11:
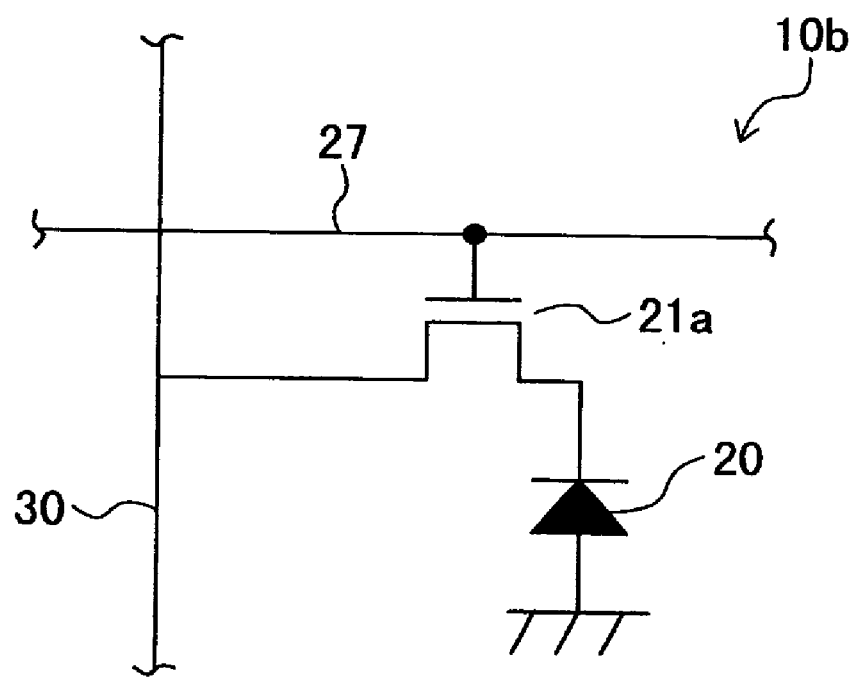
FIG. 11 is an equivalent circuit diagram showing an example of a pixel having one transistor.

FIG. 11 is an equivalent circuit diagram showing an example of a pixel having one photoelectric converter element and one transistor. The same constituent components shown in FIG. 11 as those shown in FIG. 1B are assigned with the same reference numerals and description thereof will be avoided.

A pixel 10b shown in FIG. 11 includes a photoelectric converter element 20, an output signal line 30, and one transistor 21a electrically connected to the element 20 and the line 30. A row selection signal line 27 is electrically connected to a control terminal (gate) of the transistor 21a. Structurally, part of the row selection signal line 27 may serve as the gate electrode of the transistor 21a.

When a predetermined voltage is applied to the row selection signal line 27, electric charge accumulated in the photoelectric converter element 20 is read out to the associated output signal line 30. An output signal is generated on the output signal line 30. The current signal is directly used as an image signal or is converted into a digital signal to be used as an image signal. The image signal readout operation can be conducted in the pixel row unit.

In the electronic shutter operation, each output signal line 30 is electrically connected, for example, to a power source voltage. In this state, a predetermined voltage is sequentially applied to each row selection signal line 27. Electric charge can be discharged in the pixel row unit. The reset row-shifter 45 shown in FIG. 1A can be dispensed with.

In the overall reset operation, each output signal line 30 is electrically connected, for example, to a power source voltage. In this state, a predetermined voltage is applied to each row selection signal line 27 at a time. Electric charge accumulated in each photoelectric converter element 20 is discharged at a time.

A MOS-type solid-state image pickup device capable of conducting the overall reset operation can be installed in a digital camera not including a light shielding device.

One control signal generator constituting the overall reset controller is not necessarily disposed for each pixel row. The control signal generators may be less in number than the pixel rows. For example, it is also possible that a reset signal generated by one control signal generator is supplied to all reset signal lines. This also applies to the number of control signal generators constituting the reset row-shifter, the number of control signal generators constituting the readout row-shifter, and the number of control signal generators constituting the transfer control row-shifter.

The overall reset controller, the reset row-shifter, the readout row-shifter, and the transfer control row-shifter can be arranged in parallel along one edge of the pertinent semiconductor substrate or can be distributively arranged at respective locations on the pertinent semiconductor substrate.

The number of the electronic shutter operations stopped by the first still picture mode controller or the second still picture mode controller is not limited to two. Similarly, the electronic shutter operations stopped by the first still picture mode controller or the second still picture mode controller is not limited to the electronic shutter operation to be started during a first vertical blanking period set after a still picture indication signal is outputted and to the electronic shutter operation to be started during a vertical blanking period subsequent to the vertical blanking period. According to performance and/or use required for the digital camera or timing at which the still picture indication signal is outputted, it is possible to stop at least one electronic shutter operation during a desired period after the still picture indication signal is outputted.

To produce still picture data of an object shot with a long period of exposure time, a third still picture mode controller may be additionally disposed. To achieve long-term exposure, the controller stops the electronic shutter operation successively two or more times. This prevents the image signal readout operation which is otherwise executed during a period of time between the stopped electronic shutter operations. The overall reset operation is not conducted in this situation.

The MOS-type solid-state image pickup device capable of conducting the overall reset operation may be an image pickup device for monochrome or color pictures.

In either the MOS-type solid-state image pickup device for monochrome or color pictures, a light shielding film is disposed in general to prevent unnecessary photoelectric conversion in areas other than the photoelectric converter elements. To increase light utilization efficiency of the photoelectric converter elements, one microlens and/or one inner lens are/is arranged over each photoelectric converter element depending on cases. In the MOS-type solid-state image pickup for color pictures, a color filter is provided for each photoelectric converter element.

Figure 12:
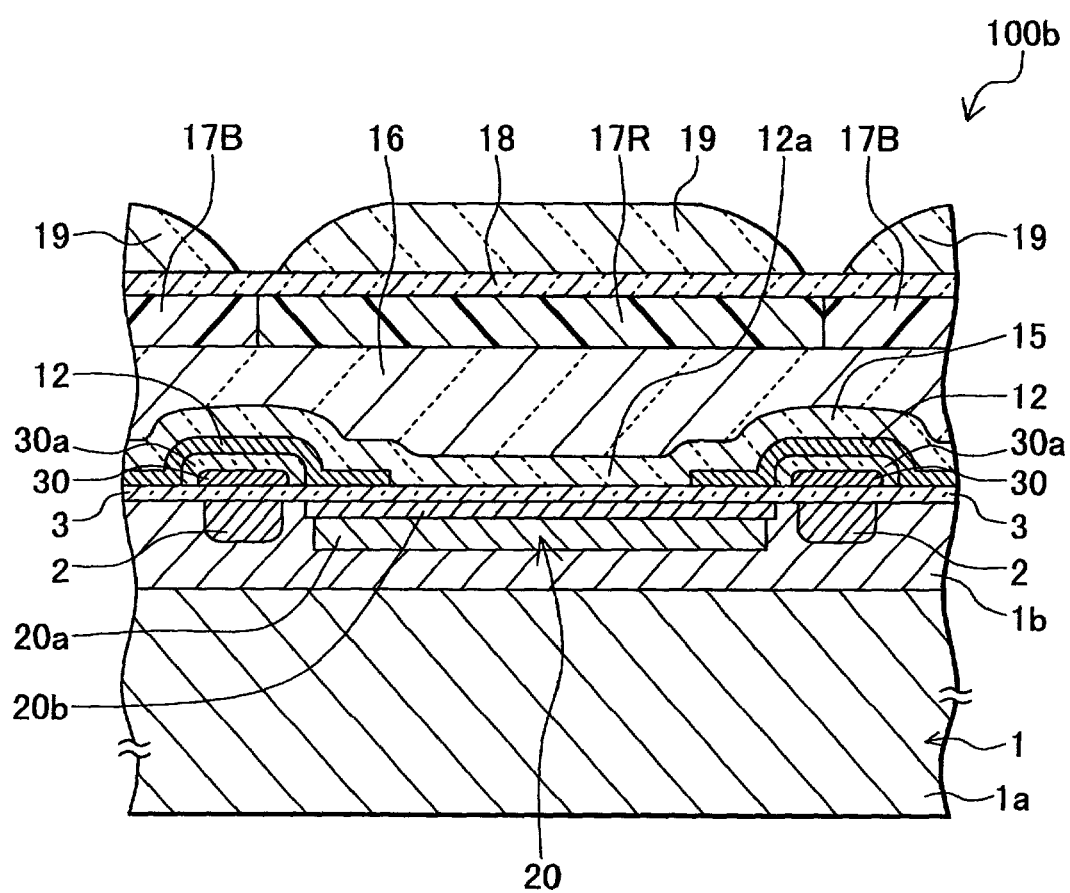
FIG. 12 is a cross-sectional view schematically showing an example of a MOS-type solid-state image pickup device to produce a color picture.

FIG. 12 schematically shows, in a cross-sectional view, an example of a MOS-type solid-state image pickup device for color pictures.

In the MOS-type solid-state image pickup device 100b shown in FIG. 12, on a semiconductor substrate 1 in which photoelectric converter elements 20, various transistors and wiring lines electrically connected to the photoelectric converter elements 20, shifters such as a readout row-shifter, outputting devices such as an image signal outputting device, and a controller have been completely formed, a light shielding film 12 is formed to cover these members.

The semiconductor substrate 1 includes, for example, an n-type semiconductor substrate 1a, a p-type impurity diffused region 1b formed in one surface of the n-type semiconductor substrate 1a.

Each photoelectric converter element 20 is composed of a buried type photodiode having an n-type impurity diffused region 20a formed in a predetermined location of the p-type impurity diffused region 1b and a $p^+$-type impurity diffused region 20b formed on the n-type impurity diffused region 20a. Concentration of p-type impurity in the $p^+$-type impurity diffused region is higher than that in the p-type impurity diffused region.

For example, a channel stop region 2 is formed in the p-type impurity diffused region 1b to surround each photoelectric converter element 20 in a plan view. The channel stop region 2 is formed with, for example, a $p^+$-type impurity diffused region.

On surfaces respective of the p+-type impurity diffused region 20b, the channel stop region 2, and the p-type impurity diffused region, an electrically insulating layer 3 is formed.

In other locations of the semiconductor substrate 1, a gate electrode is formed on the insulating layer 3, and an n-type impurity diffused region is formed on both sides of the gate electrode to thereby form a transistor.

Various wiring lines associated with the pixels are formed on the electrically insulating layer 3. Formed respectively on surrounding of these lines are electrically insulating layers, which electrically isolate the lines from each other. FIG. 12 shows output signal lines 30 and electrically insulating films 30a formed on surfaces of the lines 30.

For each photoelectric converter element 20, the light shielding film 12 has one opening 12a of a predetermined contour over the element 20. Each opening 12a is disposed within an area defined by edges of the n-type impurity diffused region 20a in a plan view.

The light shielding film 12 is formed by using a metallic thin film made of metal such as aluminum, chrome, tungsten, titanium, or molybdenum; an alloy film of an alloy including two or more of these metals; a multilayer metallic thin film including a combination of metallic films made of metals selected from those above, or a multilayer metallic thin film including a combination of metallic films made of metals selected from the metals above and alloy films made of alloys selected from the alloys above.

On the light shielding film 12 and portions of the electrically insulating layer 3 exposed in the openings 12a, a passivation film 15 made of electrically insulating material is provided. The film 15 is, for example, a silicon nitride film or a silicon oxide film highly containing phosphorus or boron.

On the passivation film 15, a first planarizing film 16 is formed. The first planarizing film 16 is also used as a focus adjusting layer of a microlens, which will be described later. When necessary, inner lenses are formed in the first planarizing film 16.

The first planarizing film 16 is formed, for example, by coating a desired thickness of a transparent resin such as photo resist on the passivation film 15, for example, by spin coating.

On the first planarizing film 16, a predetermined number of color filters are formed. A plurality of kinds of color filters to produce color pictures is formed in a predetermined pattern to configure a color filter array. A color filter array of three primary colors (red, green, and blue) and a color filter array of complementary colors are available.

In either type of the color filter arrays, one color filter is disposed over each photoelectric converter element 20. FIG. 11 shows color filters 17R and 17B of mutually different colors. Three color filters 17B, 17R, and 17B are shown in FIG. 11.

The color filter array can be produced, for example, by forming at predetermined location layers of resin (color resin) containing pigments or dyes of desired colors.

On the color filter array, a second planarizing film 18 is formed. The film 18 is formed, for example, by coating a desired thickness of transparent resin such as photo resist on the color filter array, for example, by spin coating.

On the second planarizing film 18, a predetermined number of microlenses 19 are formed in an array. One microlens is disposed over each photoelectric converter element 20.

The microlens 19 is formed, for example, as follows. A layer of transparent resin (including photo resist) having a refractive index of about 1.3 to about 2.0 is divided into predetermined partitions. The transparent resin of each partition is melted by heat treatment to round corners of the partition by surface tension and is then cooled.

The digital camera may integrally include a strobe device. Or, a strobe device may be detachably attached to the digital camera. When the strobe device is detachably attached to the digital camera, the digital camera includes a strobe device installing device for the attachment and the detachment of the strobe device. The strobe device installing device can be used as a still picture mode specifying device. That is, the system can be configured such that when the strobe device is attached thereto, the strobe device installing device controls the second switching device 165 (FIG. 2) to specify the second still picture mode controller 135 (FIG. 2).

It will be apparent for those skilled in the art that various modifications, improvement, and combinations are possible in the embodiments.

According to the present invention, a MOS-type solid-state image pickup device to which a backlight correcting function can be easily added can be easily provided. It is easily possible to provide an digital camera in which even when an object moving at a high speed is shot to produce a still picture, a blur rarely takes place in the still picture and to which a backlight correcting function can be easily added. Use of a digital camera using a MOS-type solid-state image pickup device can be expanded.

I claim:

1. A MOS-type solid-state image pickup device comprising:
   a semiconductor substrate;
   a large number of pixels arranged in one surface of said semiconductor substrate in an array having a plurality of rows and a plurality of columns, each said pixel including (a) a photoelectric converter element having a cathode and (b) a switching circuit electrically connected to said cathode of the photoelectric converter element for controlling generation of an output signal representing electric charge accumulated in said cathode and discharge of the electric charge from said cathode;
   a plurality of row selection signal lines disposed along a row direction, each being associated with one pixel row for supplying a row selection signal;
   a plurality of output signal lines disposed along a column direction, each being associated with at least one pixel column;
   a plurality of reset signal lines disposed along the row direction, each being associated with one pixel row for supplying a reset signal;
   a row shift circuit including a row read scan circuit capable of supplying a read signal to said plurality of row selection signal lines sequentially, and a reset scan circuit capable of supplying a reset signal to said plurality of reset signal lines sequentially, the row shift circuit having no random access function;
   a power source line; and
   an overall reset controller for supplying an overall reset signal to all of said reset signal lines at one time;
   wherein said switching circuit comprises:
   a series connection of an output transistor and a selection transistor connected between the power source line and an associated output signal line, the output transistor having a gate being capable of receiving a potential generated by the charge accumulated in said cathode, the selection transistor having a gate connected to an associated row selection signal line; and
   a reset transistor connected between said cathode and said power source line, and having a gate connected to an associated reset signal line.

2. A MOS-type solid-state image pickup device according to claim 1, further comprising:
an image signal outputting device electrically connected to said output signal lines for generating an image signal representing the output signal and for sequentially outputting the image signal.

3. A MOS-type solid-state image pickup device according to claim 2 wherein said image signal outputting device comprises:
at least one analog signal generator for converting the output signal generated on each said output signal line into an analog voltage signal; and
a row-directional shifter for controlling operation of said analog signal generator and for sequentially outputting the analog voltage signal from said at least one analog signal generator.

4. A MOS-type solid-state image pickup device according to claim 2, wherein said image signal outputting device comprises:
an analog signal generator for converting the output signal generated on each said output signal line into an analog voltage signal;
an analog-to-digital converter for receiving the analog voltage signal and for converting the analog voltage signal into a digital signal; and
a buffer memory for receiving the digital signal, temporarily keeping the digital signal therein, and outputting the digital signal therefrom.

5. A MOS-type solid-state image pickup device according to claim 2, further comprising a controller for controlling operations of said overall reset controller, said row read scan circuit, said reset scan circuit, and said image signal outputting device.

6. A MOS-type solid-state image pickup device according to claim 1, further comprising:
a transfer signal line disposed for each said pixel row; and
a transfer control row-shifter for sequentially supplying a transfer control signal to said transfer signal lines, and
each said switching circuit further comprises a transfer transistor electrically connected between said cathode and the gate of said output transistor, which gate is also connected to said reset transistor, said transfer transistor including a control terminal electrically connected to said transfer signal line.

7. A MOS-type solid-state image pickup device according to claim 6, further comprising:
an image signal outputting device electrically connected to said output signal lines for generating an image signal representing the output signal and for sequentially outputting the image signal.

8. A MOS-type solid-state image pickup device according to claim 7, wherein said image signal outputting device comprises:
at least one analog signal generator for converting the output signal generated on each said output signal line into an analog voltage signal; and
a row-directional shifter for controlling operation of said analog signal generator and for sequentially outputting the analog voltage signal from said analog signal generator.

9. A MOS-type solid-state image pickup device according to claim 7, wherein said image signal outputting device comprises:
an analog signal generator for converting the output signal generated on each said output signal line into an analog voltage signal;
an analog-to-digital converter for receiving the analog voltage signal and for converting the analog voltage signal into a digital signal; and
a buffer memory for receiving the digital signal, temporarily keeping the digital signal therein, and outputting the digital signal therefrom.

10. A MOS-type solid-state image pickup device according to claim 7, further comprising a controller for controlling operations of said overall reset controller, said row read scan circuit, said reset scan circuit, said transfer control row-shifter, and said image signal outputting device.

11. A digital camera, comprising:
a MOS-type solid-state image pickup device comprising:
(i) a semiconductor substrate;
(ii) a large number of pixels arranged in one surface of said semiconductor substrate in an array having a plurality of rows and a plurality of columns, each said pixel including (a) a photoelectric converter element having a cathode and (b) a switching circuit electrically connected to said cathode of the photoelectric converter element for controlling generation of an output signal representing electric charge accumulated in said cathode and discharge of the electric charge from said cathode;
(iii) a plurality of row selection signal lines disposed along a row direction, each being associated with one pixel row for supplying a row selection signal;
(iv) a plurality of output signal lines disposed along a column direction, each being associated with at least one pixel column;
(v) a plurality of reset signal lines disposed along the row direction, each being associated with one pixel row for supplying a reset signal;
(vi) a readout row-shifter for sequentially supplying the row selection signal to said row selection signal lines;
(vii) a reset row-shifter for sequentially supplying the reset signal to said reset signal lines;
(viii) an overall reset controller for supplying an overall reset signal to all of said reset signal lines at one time;
(ix) a row shift circuit including a row read scan circuit capable of supplying a read signal to said plurality of row selection signal lines sequentially, and a reset scan circuit capable of supplying a reset signal to said plurality of reset signal lines sequentially, the row shift circuit having no random access function;
(x) an image signal outputting device electrically connected to said output signal lines for generating an image signal representing the output signal and for sequentially outputting the image signal; and
(xi) a power source line;
wherein said switching circuit comprises:
a series connection of an output transistor and a selection transistor connected between the power source line and an associated output signal line, the output transistor having a gate being capable of receiving a potential generated by the charge accumulated in said cathode, the selection transistor having a gate connected to an associated row selection signal line; and
a reset transistor connected between said cathode and said power source line, and having a gate connected to an associated reset signal line;
an image signal processor for generating mobile picture data or still picture data using the image signal outputted from said MOS-type solid-state image pickup device;
a light shielding device for interrupting light incident to said MOS-type solid-state image pickup device;

a still picture indication signal generator for generating a still picture indication signal indicating shooting of a still picture;

a mobile picture mode controller electrically connected to said MOS-type solid-state image pickup device for continually control operation thereof for repeatedly conducting (a) an image readout operation in which the row selection signal is sequentially supplied from said readout row-shifter to a predetermined number of row selection signal lines for sequentially outputting from said image signal outputting device an image signal representing the output signal generated on each said output signal line and (b) an electronic shutter operation in which the reset signal is sequentially supplied from said reset row-shifter to said reset signal supply lines at least associated with said pixel row as an object of the image signal readout operation for sequentially discharge electric charge accumulated in said photoelectric converter elements; and a first still picture mode controller electrically connected to said MOS-type solid-state image pickup device for controlling in place of said mobile mode controller, when the still picture indication signal is outputted, operations of said MOS-type solid-state image pickup device and said light shielding device, for conducting an overall reset operation in which the overall reset controller is operated, in a state in which the operations of said readout row-shifter and said reset row-shifter are stopped, and electric charge accumulated in all said photoelectric converter elements is discharged, and for conducting an image signal readout operation in which said light shielding device is operated and interrupts the incident light for a predetermined period of time after the overall reset operation is finished, and the row selection signal is sequentially supplied from said readout row-shifter to said row selection signal lines for sequentially outputting an image signal representing the output signal generated on said output signal lines from said image signal outputting device.

12. A digital camera according to claim 11, wherein:
when an electronic shutter operation or an image signal readout operation is being executed at a point of time when the still picture indication signal is outputted, said first still picture mode controller does not interrupt the operation; and when an electronic shutter operation is being executed at a point of time when the still picture indication signal is outputted, said first still picture mode controller conducts the image signal readout operation once after the electronic shutter operation; and then the first still picture mode controller conducts the overall reset operation.

13. A digital camera according to claim 11, wherein said MOS-type solid-state image pickup device further comprises:
a transfer signal line disposed for each said pixel row; and
a transfer control row-shifter for sequentially supplying a transfer control signal to said transfer signal lines, and
each said switching circuit further comprises
a transfer transistor electrically connected between said cathode and the gate of said output transistor, which gate is also connected to said reset transistor,
said transfer transistor including a control terminal electrically connected to said transfer signal line
said mobile picture mode controller or said first still picture mode controller conducting said transfer control row-shifter for sequentially supplying, in the image readout operation, the row reset operation, or the overall reset operation, the transfer control signal to each said transfer signal lines associated with said pixel row as an object of the operation.

14. A digital camera according to claim 11, further comprising:
a strobe device for emitting flash light when a predetermined signal is received or said strobe device installing device for installing therein;

a second still picture mode controller electrically connected to said MOS-type solid-state image pickup device for controlling in place of said mobile mode controller, when the still picture indication signal is outputted, operations of said MOS-type solid-state image pickup device and said light shielding device, for conducting an overall reset operation in which the overall reset controller is operated, in a state in which the operations of said readout row-shifter and said reset row-shifter are stopped, and electric charge accumulated in all said photoelectric converter elements is discharged, and for conducting an image signal readout operation in which after the overall reset operation is finished, a strobe device operation signal is generated for operating said strobe device; said light shielding device is operated and interrupts the incident light for a predetermined period of time after said strobe device operation signal is generated; and the row selection signal is sequentially supplied from said readout row-shifter to said row selection signal lines for sequentially outputting an image signal representing the output signal generated on said output signal lines from said image signal outputting device; and a still picture mode specifying device for specifying, beforehand, a still picture mode controller to be operated when the still picture indication signal is outputted.

15. A digital camera according to claim 14, wherein:
when an electronic shutter operation or an image signal readout operation is being executed at a point of time when the still picture indication signal is outputted, said second still picture mode controller does not interrupt the operation; and when an electronic shutter operation is being executed at a point of time when the still picture indication signal is outputted, said second still picture mode controller conducts the image signal readout operation once after the electronic shutter operation; and then the second still picture mode controller conducts the overall reset operation.

16. A digital camera according to claim 14, wherein said MOS-type solid-state image pickup device further comprises:
a transfer signal line disposed for each said pixel row; and
a transfer control row-shifter for sequentially supplying a transfer control signal to said transfer signal lines, and
each said switching circuit further comprises
a transfer transistor electrically connected between said cathode and the gate of said output transistor, which gate is also connected to said reset transistor,
said transfer transistor including a control terminal electrically connected to said transfer signal line.
said mobile picture mode controller, said first still picture mode controller or said second still picture mode controller conducting said transfer control row-shifter for sequentially supplying, in the image readout operation, the row reset operation, or the overall reset operation, the transfer control signal to each said transfer signal lines associated with said pixel row as an object of the operation.

17. A MOS-type solid-state image pickup device comprising:

a semiconductor substrate;

a large number of pixels arranged in one surface of said semiconductor substrate in an array having a plurality of rows and a plurality of columns, each said pixel including (a) a photoelectric converter element having a cathode and (b) a switching circuit electrically connected to said cathode of the photoelectric converter element for controlling generation of an output signal representing electric charge accumulated in said cathode and discharge of the electric charge from said cathode;

a plurality of row selection signal lines disposed along a row direction, each being associated with one pixel row for supplying a row selection signal to select pixels of the associated pixel row;

a plurality of output signal lines disposed along a column direction, each being associated with at least one pixel column for supplying output signals of the pixels selected by the row selection signal;

a plurality of reset signal lines disposed along the row direction, each being associated with one pixel row for supplying a reset signal to clear the pixels of the associated pixel row;

a row shift circuit including a row read scan circuit capable of supplying a read signal to said plurality of row selection signal lines sequentially, and a reset scan circuit capable of supplying a reset signal to said plurality of reset signal lines sequentially, the row shift circuit having no random access function;

a power source line; and an overall reset controller for supplying an overall reset signal to all of said reset signal lines at one time;

wherein said switching circuit comprises:

a series connection of an output transistor and a selection transistor connected between the power source line and an associated output signal line, the output transistor having a gate being capable of receiving a potential generated by the charge accumulated in said cathode, the selection transistor having a gate connected to an associated row selection signal line; and a reset transistor connected between said cathode and said power source line, and having a gate connected to an associated reset signal line.

* * * * *